Figure 10:
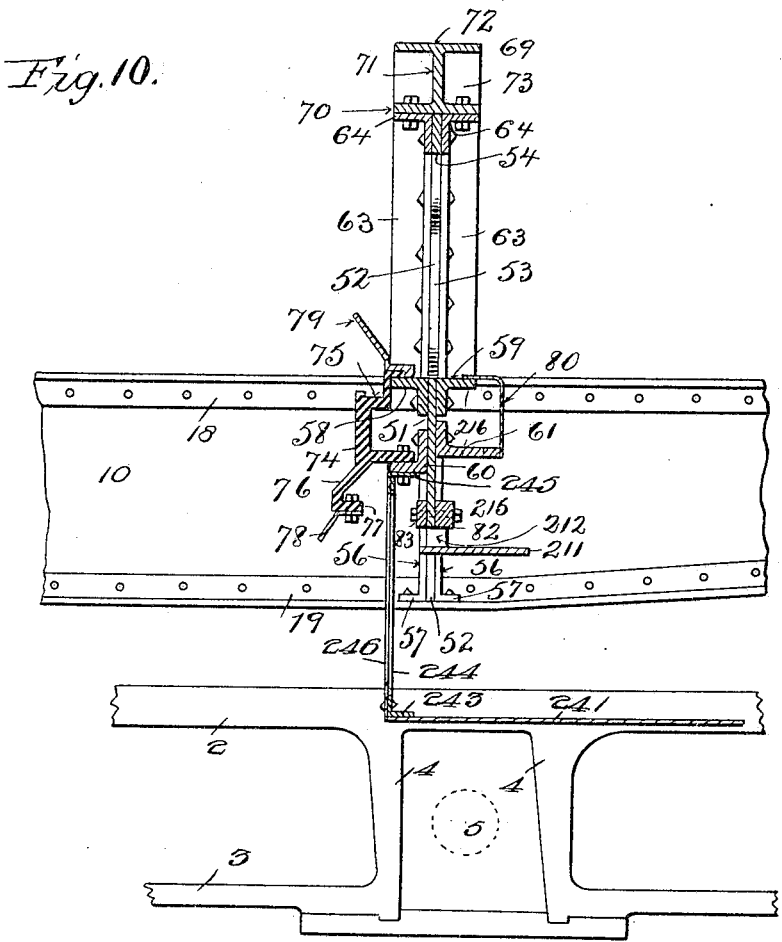

No. 787,240. PATENTED APR. 11, 1905.
C. VANDERBILT.
STEAM GENERATING APPLIANCE AND ADAPTATION OF SAME TO LOCOMOTIVES.
APPLICATION FILED DEC. 17, 1900. RENEWED SEPT. 17, 1904.
21 SHEETS—SHEET 1.
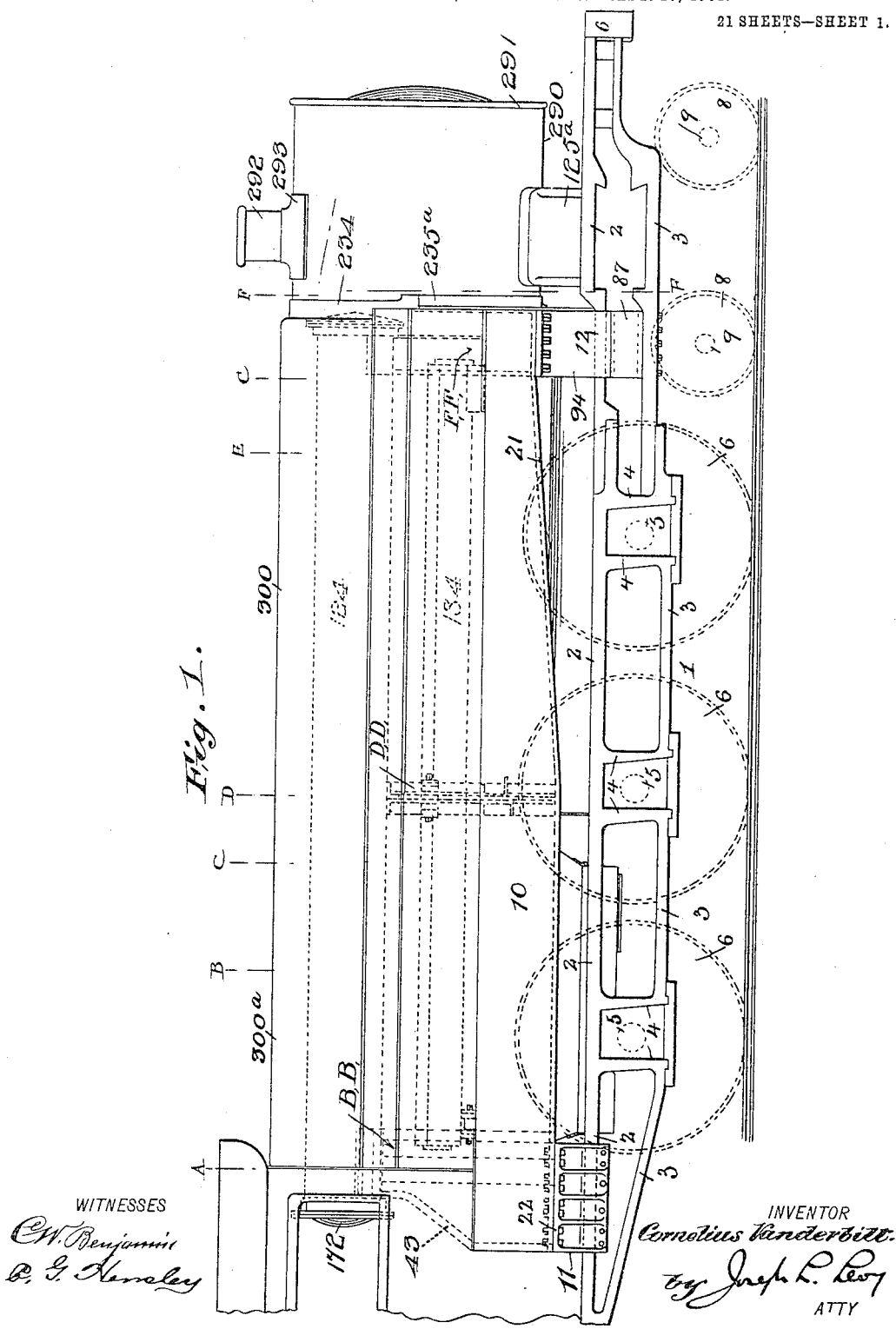

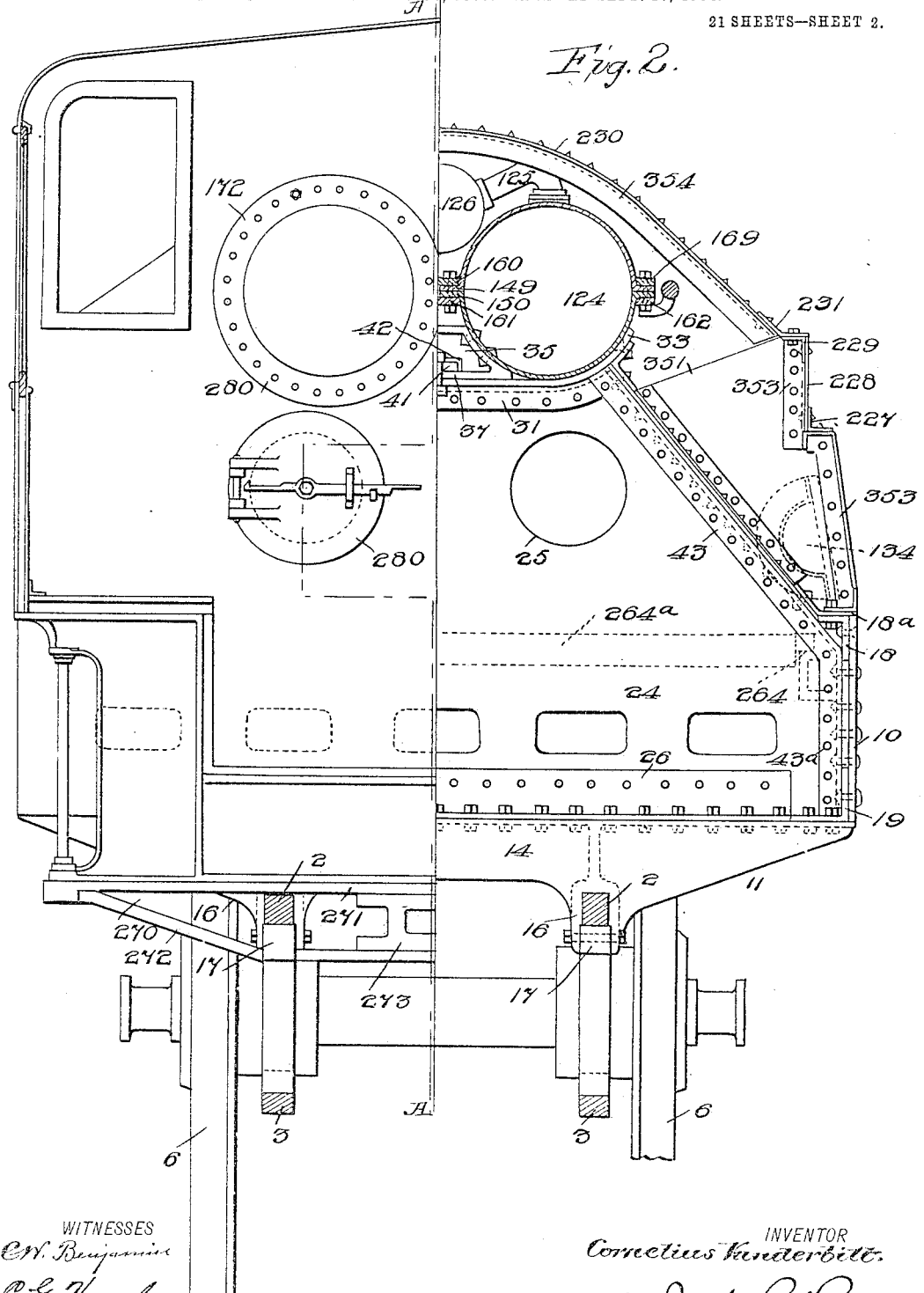

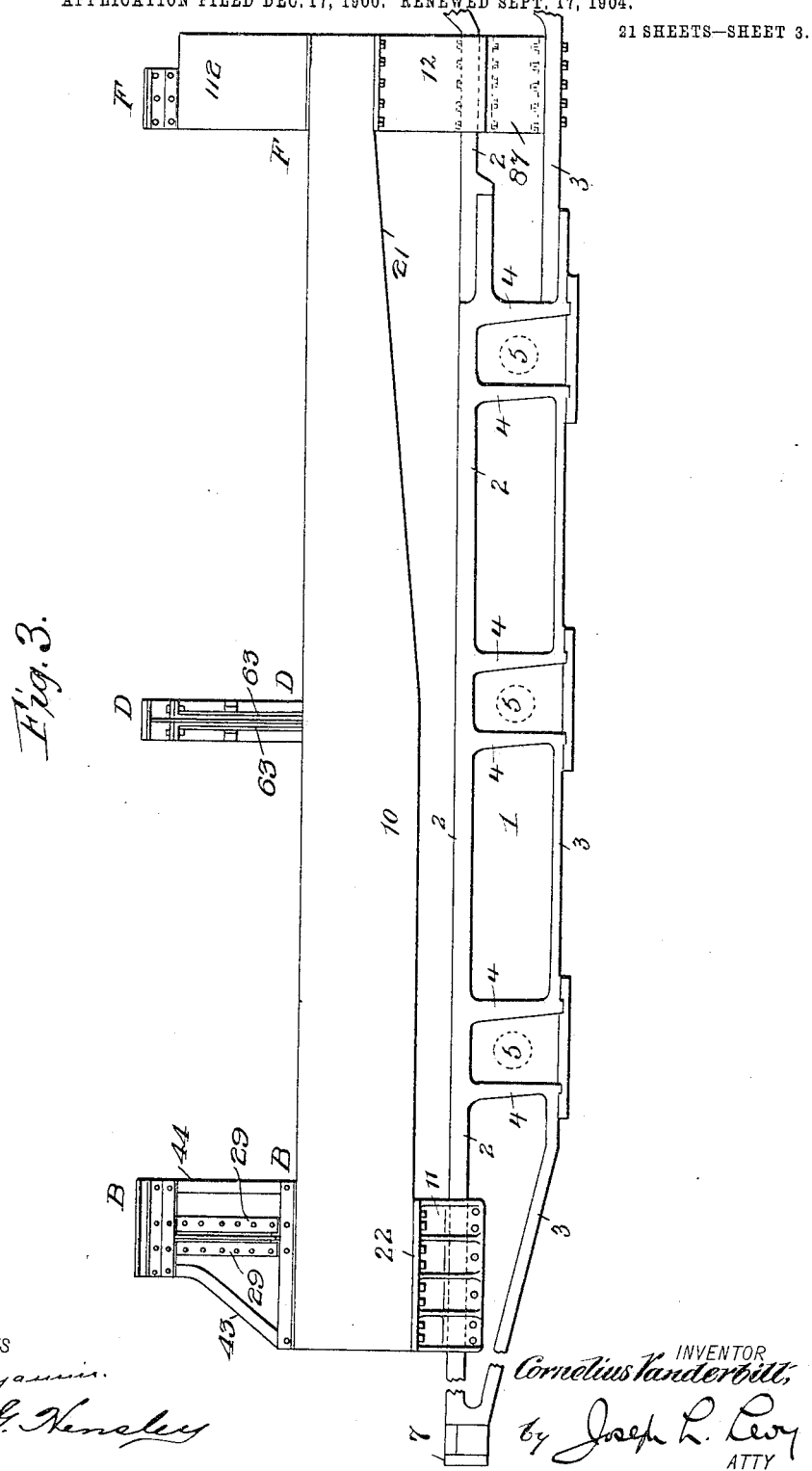

No. 787,240. PATENTED APR. 11, 1905.
C. VANDERBILT.
STEAM GENERATING APPLIANCE AND ADAPTATION OF SAME TO LOCOMOTIVES.
APPLICATION FILED DEC. 17, 1900. RENEWED SEPT. 17, 1904.

21 SHEETS—SHEET 4.

No. 787,240. PATENTED APR. 11, 1905.
C. VANDERBILT.
STEAM GENERATING APPLIANCE AND ADAPTATION OF SAME TO LOCOMOTIVES.
APPLICATION FILED DEC. 17, 1900. RENEWED SEPT. 17, 1904.
21 SHEETS—SHEET 5.
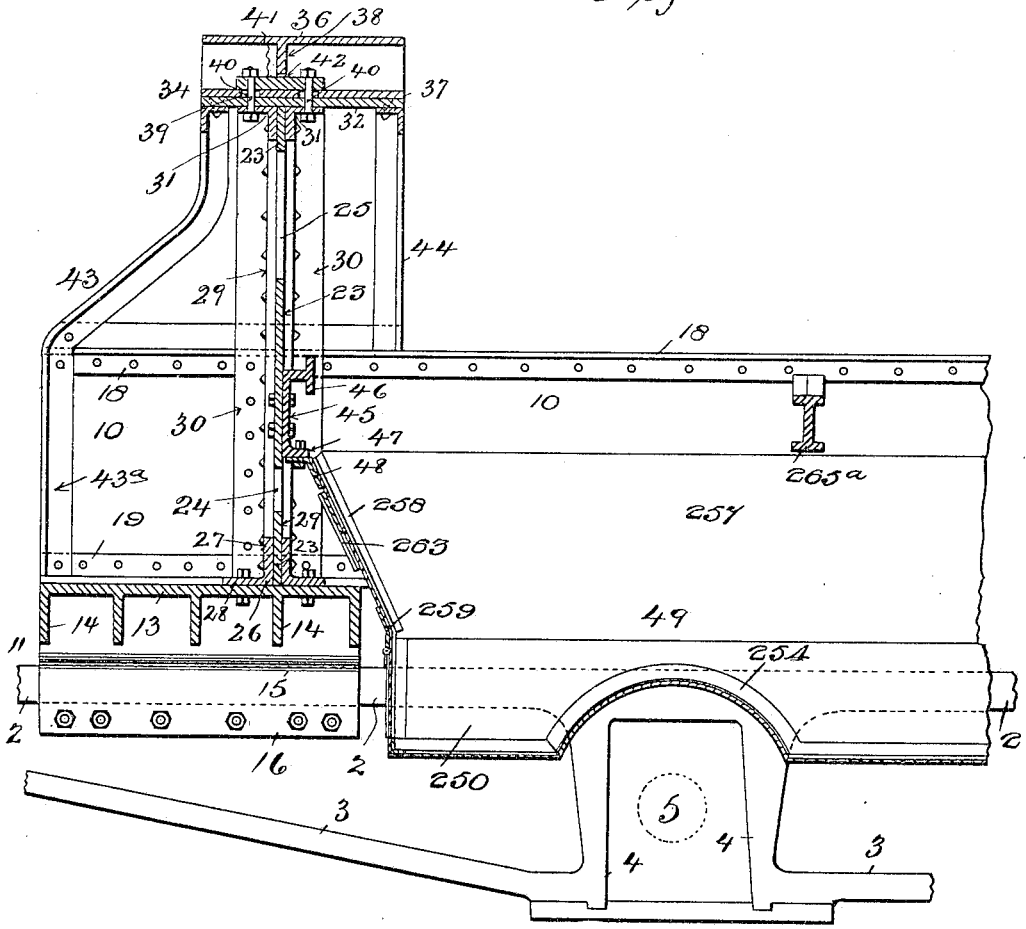

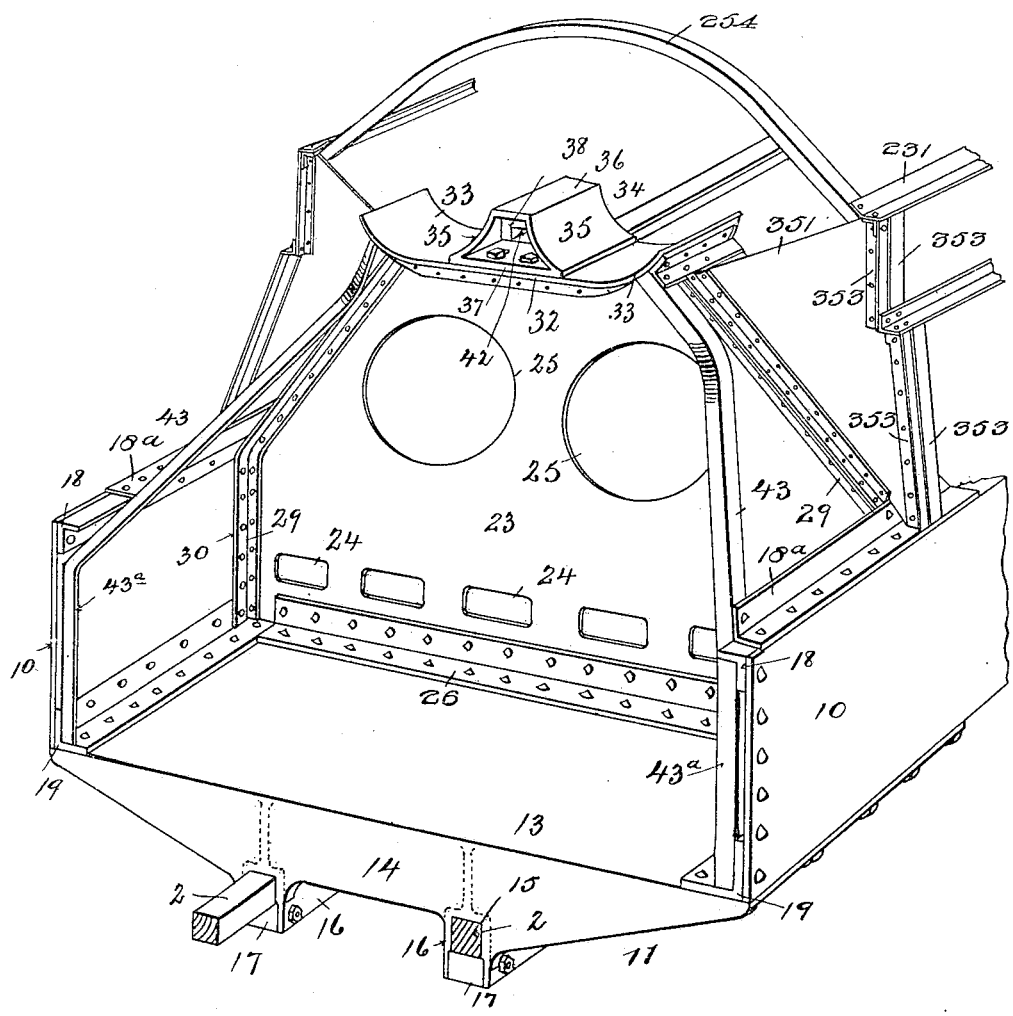

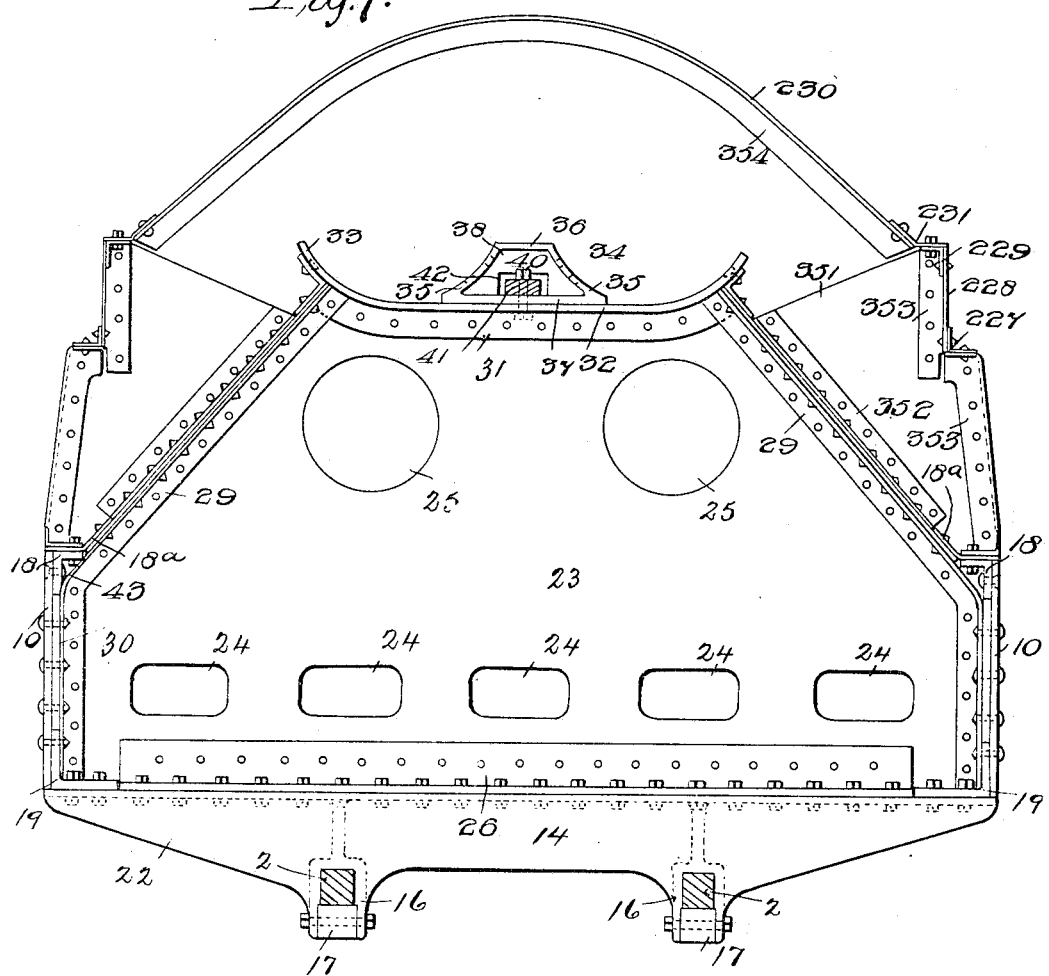

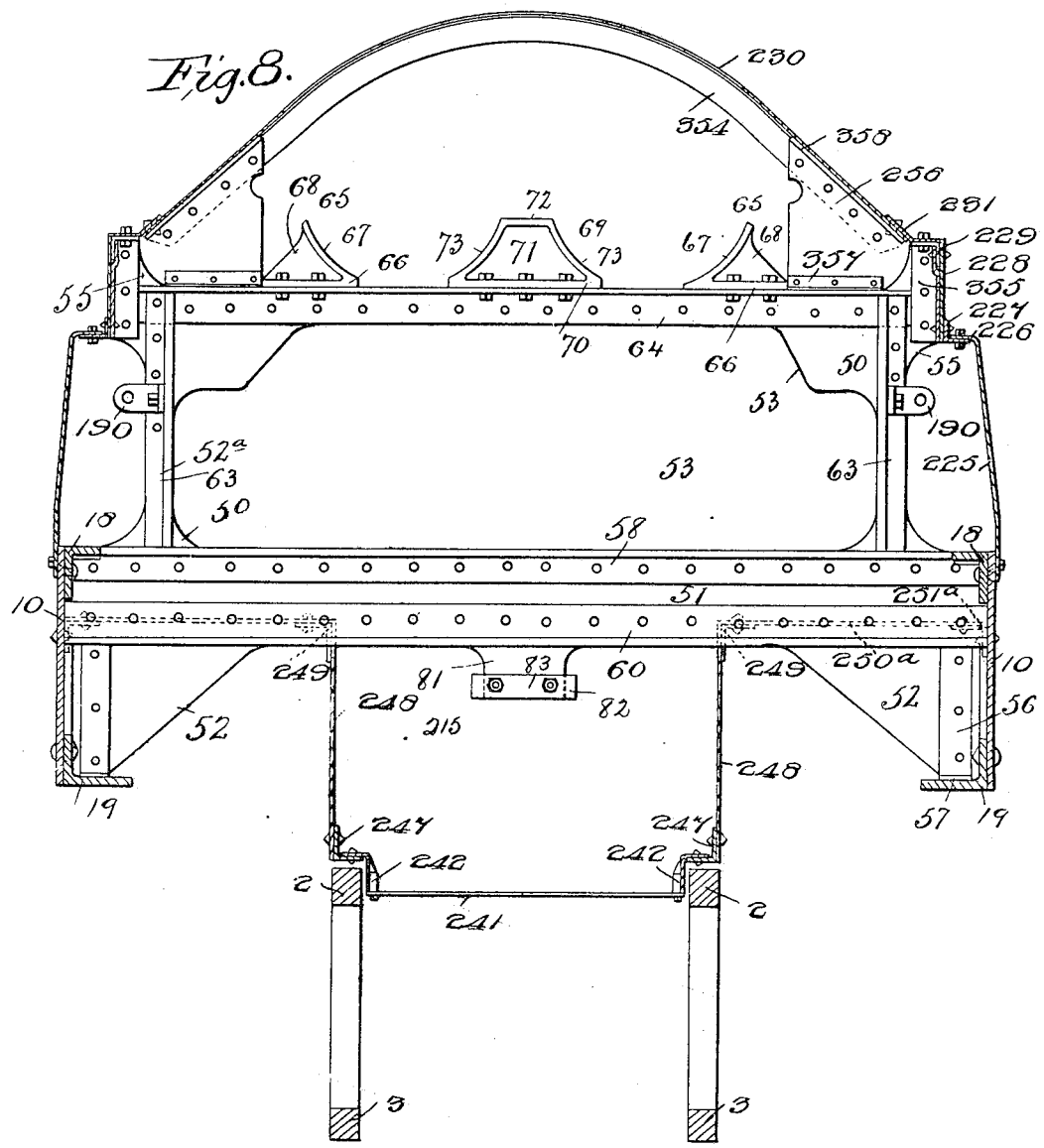

No. 787,240. PATENTED APR. 11, 1905.
C. VANDERBILT.
STEAM GENERATING APPLIANCE AND ADAPTATION OF SAME TO LOCOMOTIVES.
APPLICATION FILED DEC. 17, 1900. RENEWED SEPT. 17, 1904.
21 SHEETS—SHEET 9.
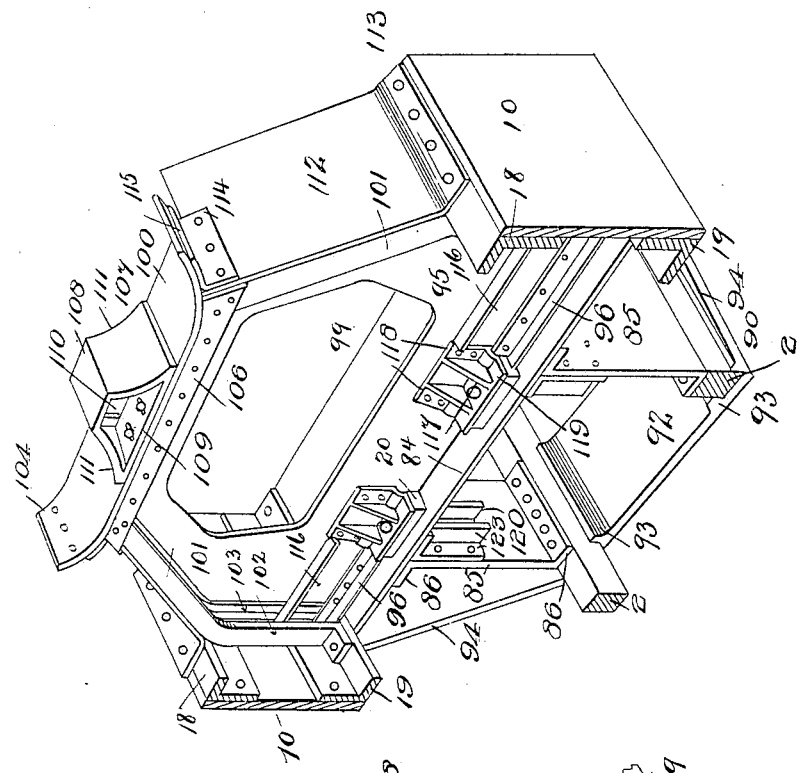
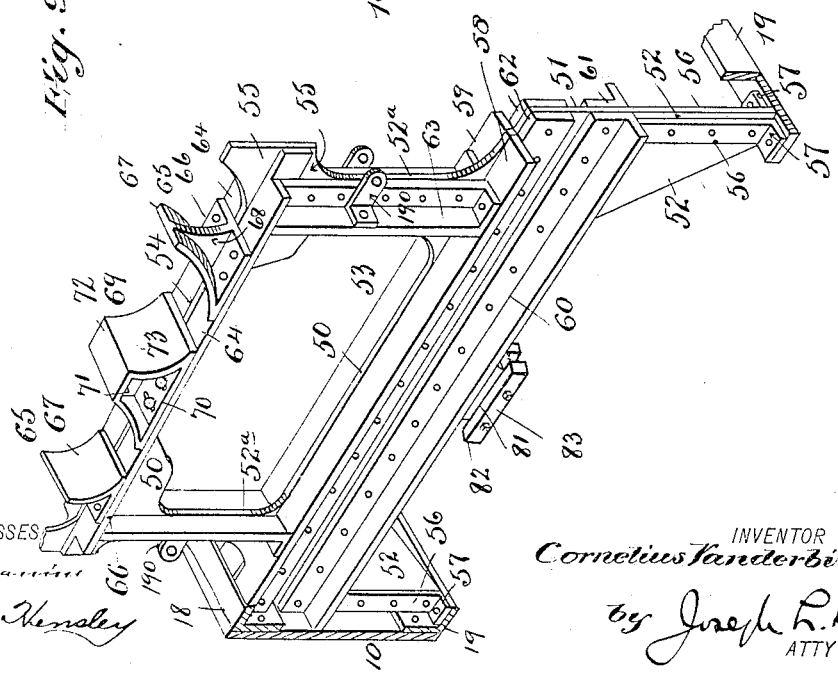
WITNESSES
Cev. Benjamin
Chas. G. Hensley
INVENTOR
Cornelius Vanderbilt:
by Joseph L. Levy
ATTY No. 787,240. PATENTED APR. 11, 1905.
C. VANDERBILT.
STEAM GENERATING APPLIANCE AND ADAPTATION OF SAME TO LOCOMOTIVES.
APPLICATION FILED DEC. 17, 1900. RENEWED SEPT. 17, 1904.

21 SHEETS—SHEET 10.

WITNESSES
C. W. Benjamin
Chas. G. Nemsley

INVENTOR
Cornelius Vanderbilt
by Joseph L. Levy
ATTY

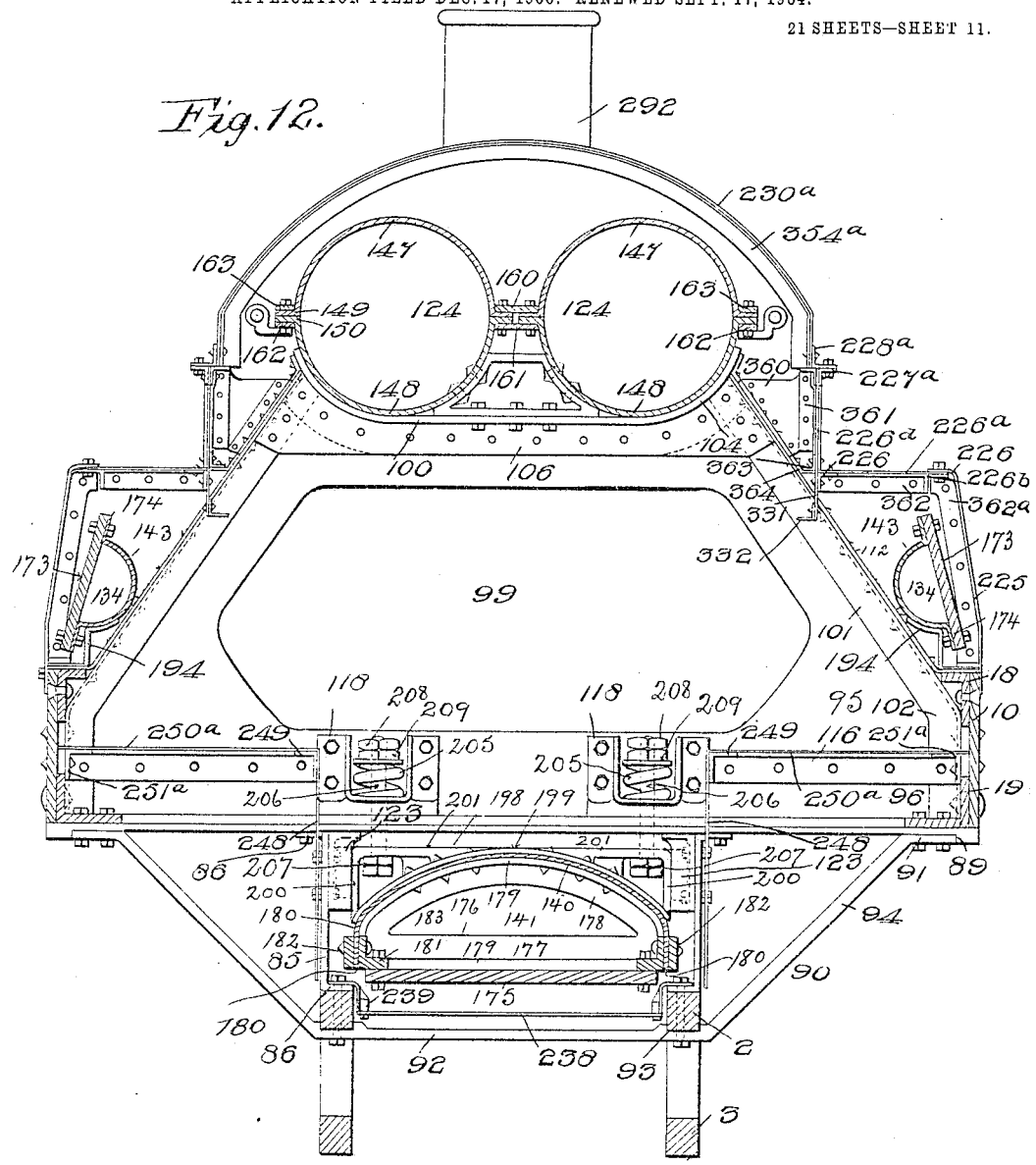

No. 787,240. PATENTED APR. 11, 1905.
C. VANDERBILT.
STEAM GENERATING APPLIANCE AND ADAPTATION OF SAME TO
LOCOMOTIVES.
APPLICATION FILED DEC. 17, 1900. RENEWED SEPT. 17, 1904.

21 SHEETS—SHEET 13.

WITNESSES
C. W. Benjamin
Chas. G. Hensley

INVENTOR
Cornelius Vanderbilt.
by Joseph L. Levy
ATTY

No. 787,240. PATENTED APR. 11, 1905.
C. VANDERBILT.
STEAM GENERATING APPLIANCE AND ADAPTATION OF SAME TO LOCOMOTIVES.
APPLICATION FILED DEC. 17, 1900. RENEWED SEPT. 17, 1904.
21 SHEETS—SHEET 14.
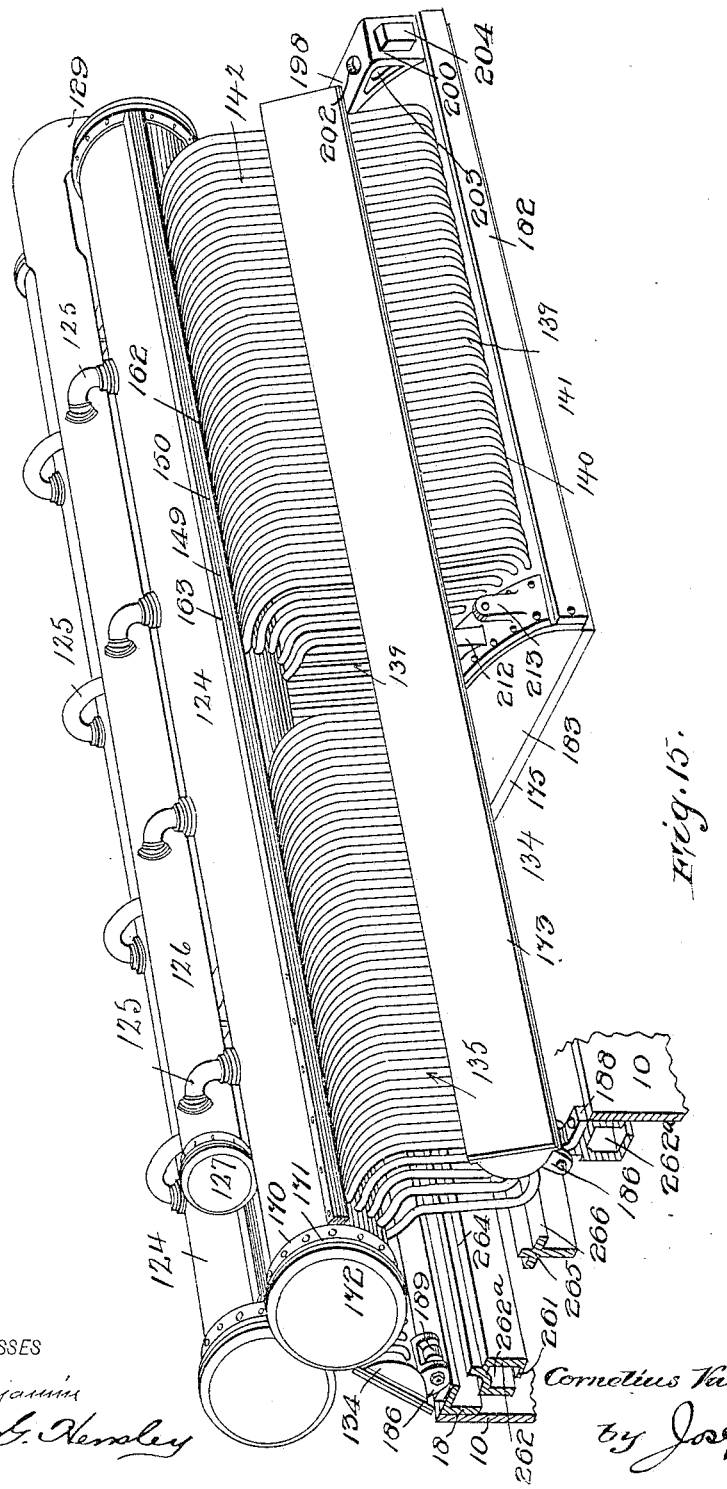

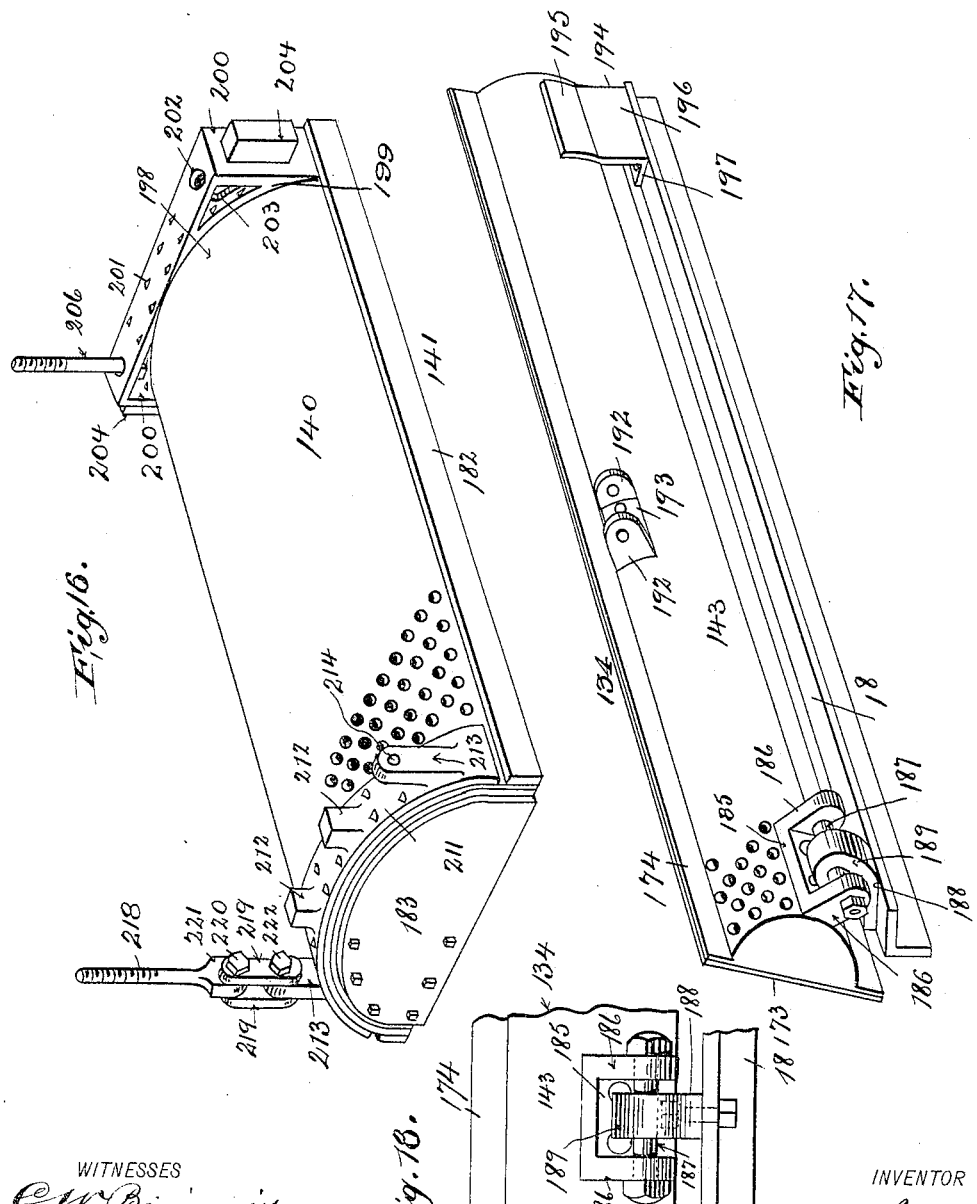

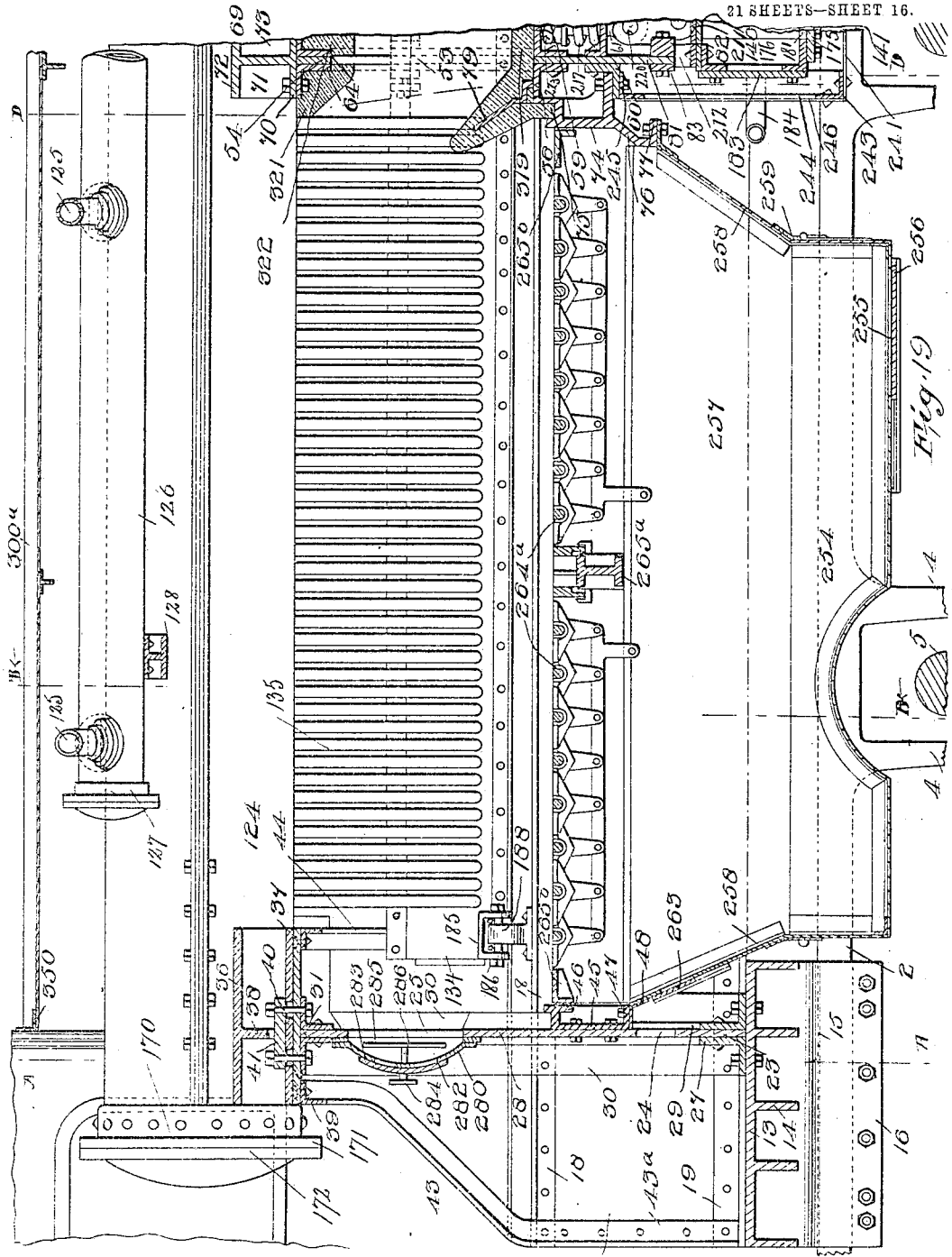

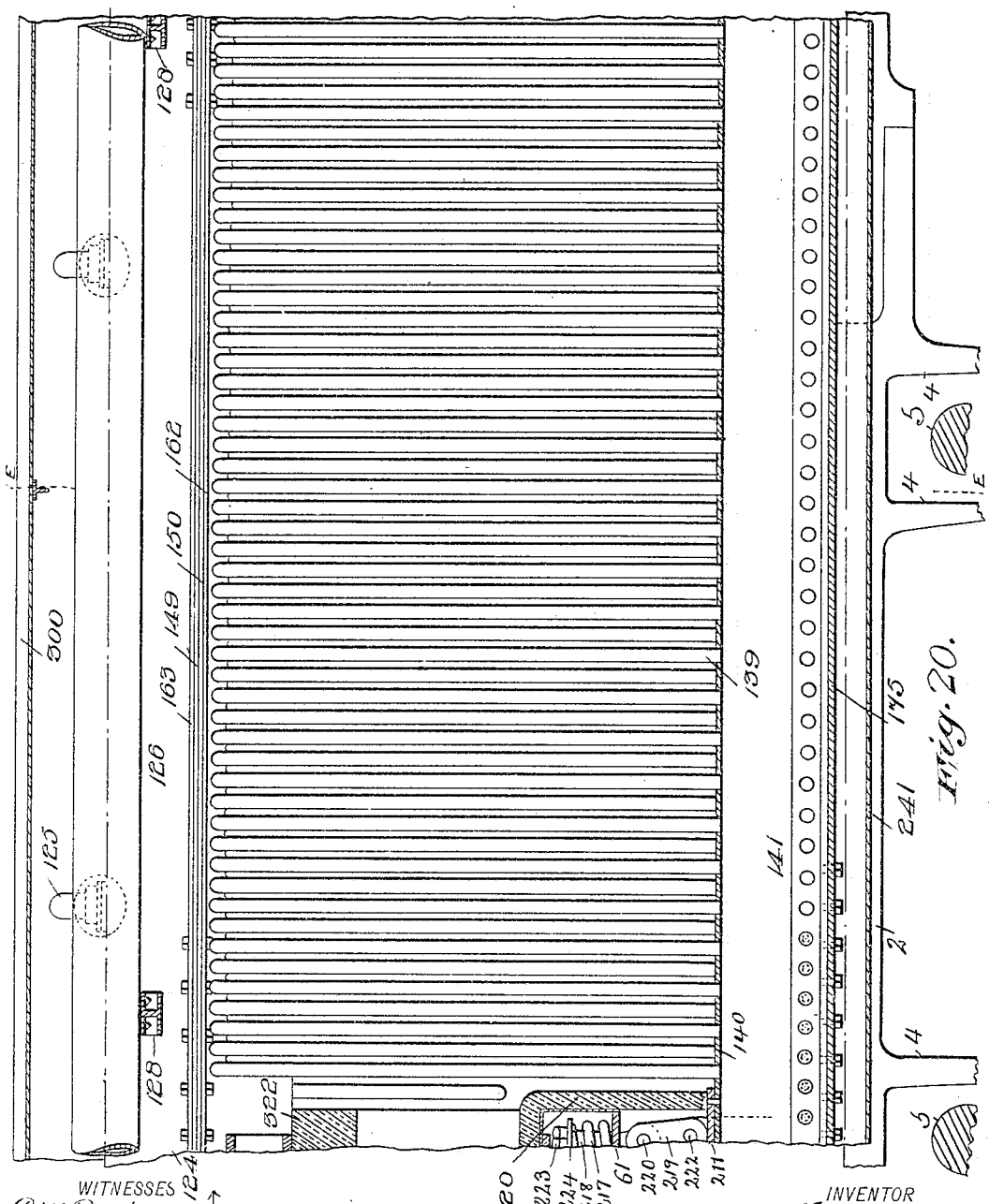

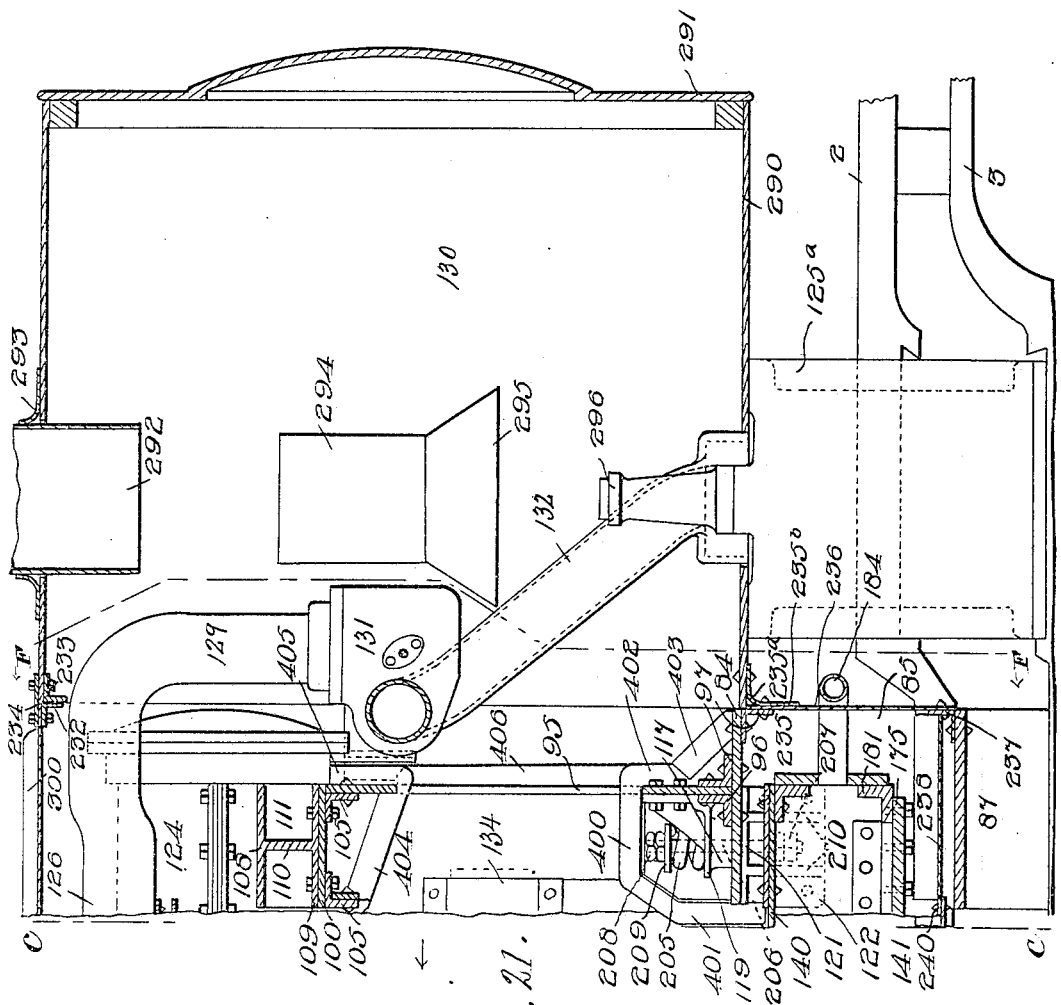

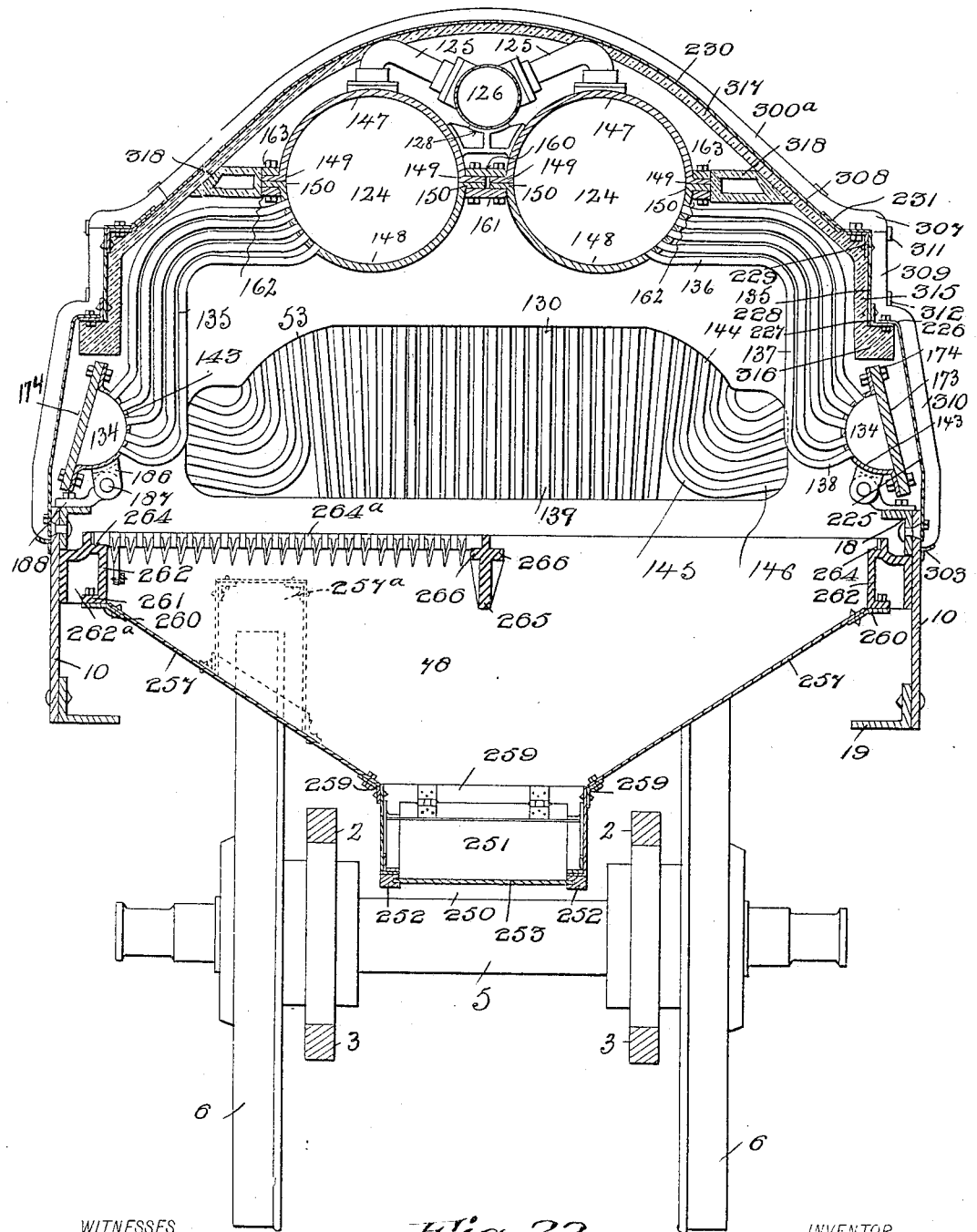

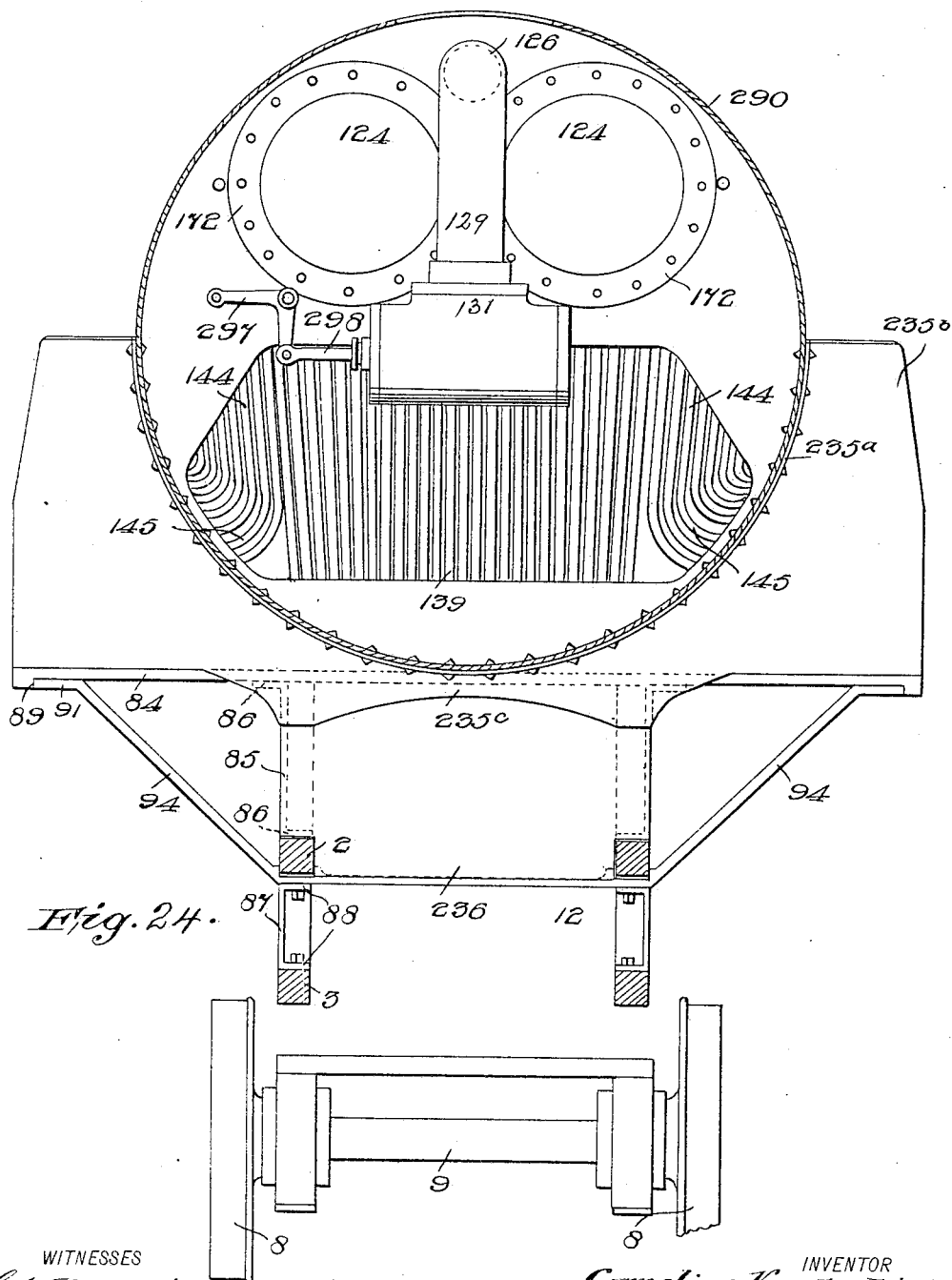

No. 787,240.                                                                                           Patented April 11, 1905.

UNITED STATES PATENT OFFICE.

CORNELIUS VANDERBILT, OF NEW YORK, N. Y.

STEAM-GENERATING APPLIANCE AND ADAPTATION OF SAME TO LOCOMOTIVES.

SPECIFICATION forming part of Letters Patent No. 787,240, dated April 11, 1905.

Application filed December 17, 1900. Renewed September 17, 1904. Serial No. 224,858.

*To all whom it may concern:*

Be it known that I, CORNELIUS VANDERBILT, a citizen of the United States, residing in the borough of Manhattan, city of New York, county and State of New York, have invented certain new and useful Improvements in Locomotives, of which the following is a specification.

This invention has for its general object to improve the construction and increase the efficiency of locomotive steam-engines, with special reference to the running-gear or frame which performs the usual functions, such as maintaining the axles in parallelism and supporting the boiler and other parts of the locomotive.

The particular features of improvement will be pointed out hereinafter with reference to the accompanying drawings, in which the same are illustrated, for purposes of explanation, as embodied in a convenient and practical structure.

Figure 13:
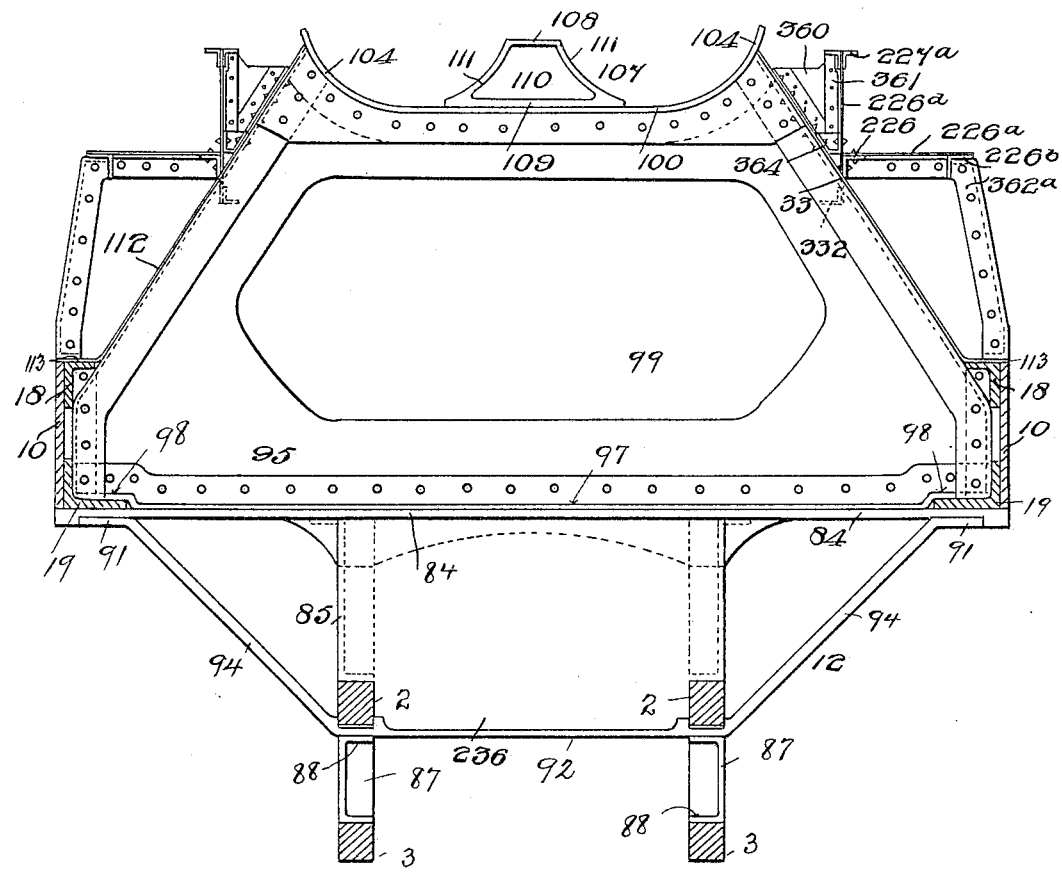
Figure 14:
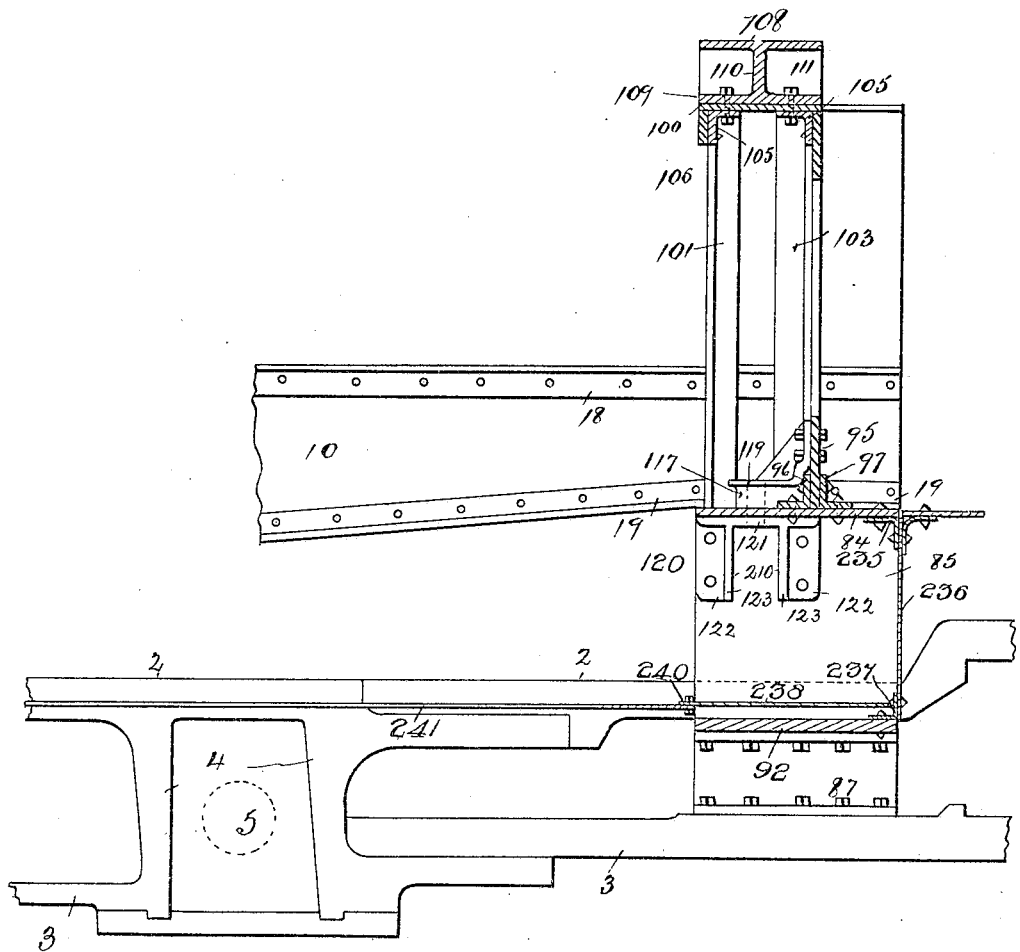
Figure 23:
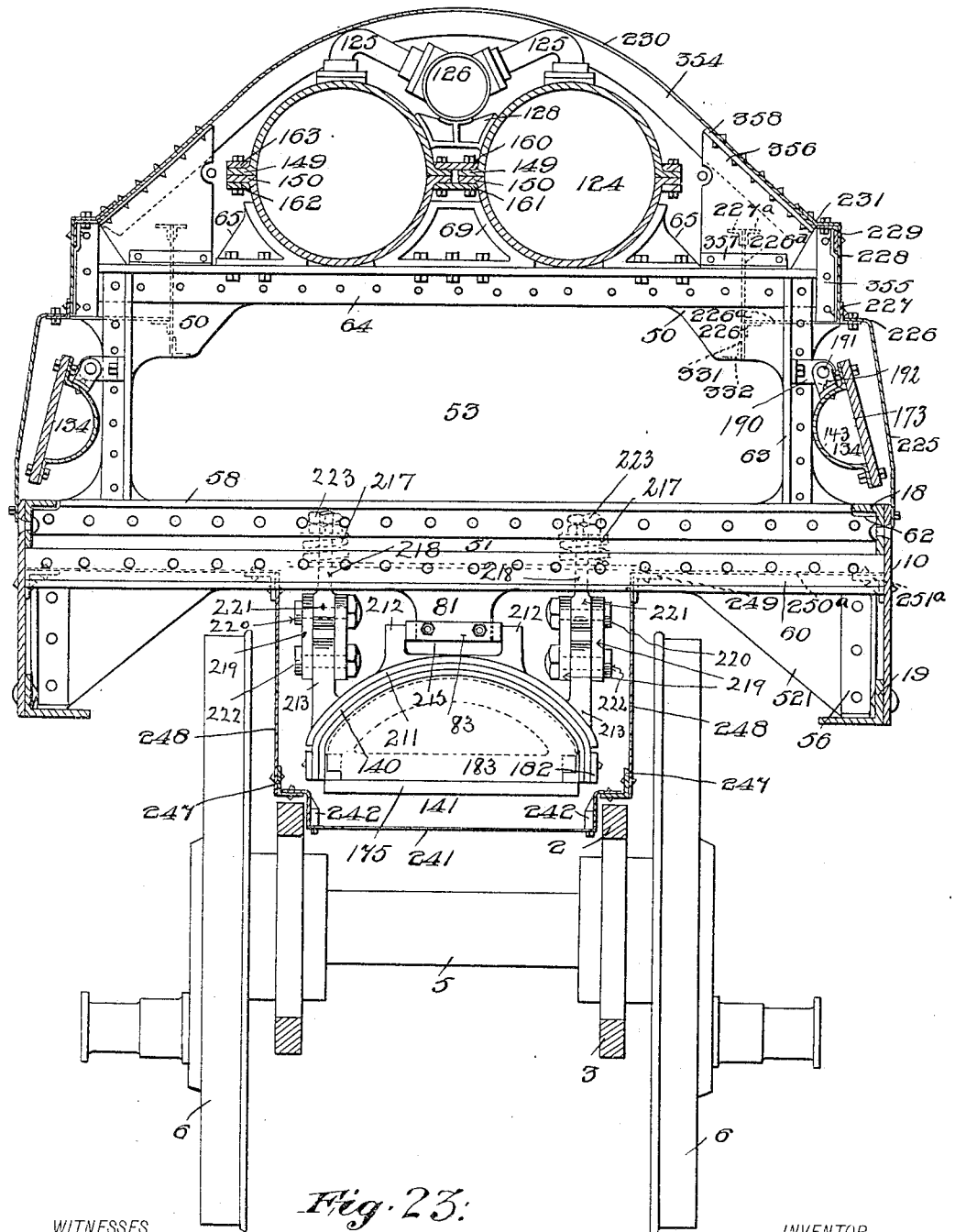

In said drawings, Figure 1 is a partial side elevation of a locomotive constructed in accordance with the invention. Fig. 2 is a rear end elevation and partial transverse sectional elevation on the line A A, Fig. 1, looking forward. Fig. 3 is a side elevation of a portion of the locomotive main frame and the intermediate frame secured together. Fig. 4 is a perspective view of the same. Fig. 5 is an enlarged sectional elevation of a portion of the rear strut B B. Fig. 6 is an enlarged perspective elevation of the rear portion of the structure shown in Fig. 3, showing the rear strut B B, the main and intermediate frames, the lagging-frame, and means for supporting the latter at the rear and upon the rear strut. Fig. 7 is an elevation of the parts shown in Fig. 6. Fig. 8 is a sectional elevation in rear of the intermediate strut D D, showing the frame construction at such intermediate strut D D. Fig. 9 is a perspective view of the intermediate strut D D, showing its connection with the side beams of the intermediate frame. Fig. 10 is an enlarged sectional elevation and side elevation of a portion of the main and intermediate frames, including the intermediate strut D D. Fig. 11 is a perspective view showing the front strut F F and its combination with the main frame and the side beams of the intermediate frame. Fig. 12 is a sectional elevation showing the main frame, the intermediate frame at the strut F F, and the sheathing-carriers. Fig. 13 is a view of the strut from the front and a portion of the main frame. Fig. 14 is a side elevation, partly in section, of a portion of the main and intermediate frame and a strut F F. Fig. 15 is a perspective view of the boiler. Fig. 16 is an enlarged perspective view of the lower header and its supporting devices. Fig. 17 is a like view of one of the side headers and its supporting devices. Fig. 18 is a detail view of the pivotal connection of the side headers to the intermediate frame. Figs. 19, 20, and 21 are different successive parts of a general view in longitudinal sectional elevation of the boiler and its supporting devices and other parts related thereto. Fig. 22 is a view in transverse sectional elevation on a plane taken through the fire-box section looking forward, part of the grate being omitted. Fig. 23 is a view in transverse sectional elevation on the plane indicated by the broken line D D of Fig. 19 looking forward. Fig. 24 is a view in transverse sectional elevation on the plane indicated by the broken line F F of Fig. 21 looking rearwardly.

Similar characters of reference indicate corresponding parts throughout the several views.

The main frame may be constructed substantially as usual or as may be preferred. By reference to Figs. 1, 3, and 4 it will be noted that the frame in the present instance comprises the side bars 1, having upper and lower chords 2 3, axle-box yokes or pedestals 4, preferably three in number, although the improvements may be applied to a locomotive having any number of wheel-axles 5 and wheels 6, the side bars 1 being tied together transversely at the end by cross-bars 6 7, Figs. 1 and 3, of any suitable construction. This specific construction of the main frame may be employed or any construction whereby a stable support under all normal conditions of service for the intermediate frame, the boiler, and other appurtenances may be attained, the essential being a stable frame providing such support and preserving the parallelism of the axles. The front end of the frame in this specific design is supported in the usual way by a pony-truck, the wheels 8 and axles 9 of which are indicated in dotted lines in Fig. 1.

The intermediate or boiler-supporting frame comprises in the herein-illustrated embodiment (see Figs. 1, 3, 4, 5, &c.) two longitudinally-extending girders 10, rigidly supported upon the main frame by chairs or castings 11 12, the girders being tied transversely by three struts, one located at the extreme forward end of the girders and generically lettered F F in Fig. 4, &c., an intermediate strut lettered D D, located just forward of the firebox section, and a rear strut B B, located slightly forward of the rear ends of the girders and defining the rear end of the furnace. The intermediate frame is held rigidly to the main frame end by the chair 12 and by its connection with the cylinder-casting through the cylindrical smoke-box. The rear chair 11 comprises a flat-top cross-web 13, Fig. 5, depending webs 14, and transverse channel-boxes 15, which embrace the top chords of the side bar of the main frame, the flanged sides 16 of the boxes being provided with filling-blocks 17, bolted together with the flanges to secure the chairs in place upon the chords. The forward chair 12 is substantially of the same construction and will be described farther on. The side girders 10 are strengthened by securing to the upper and lower inner edges thereof angle-irons 18 19, Fig. 4, &c., the forward ends of the girders being cut away, as at 21, to permit their under sides to be elevated to provide clearance for the driving mechanism and an outside link-motion. The lower angle-irons 19 are rigidly bolted to the outwardly-extending ends 22 of the chairs, as shown in Figs. 1 and 3. The intermediate frame and the parts carried thereby are thus finally supported upon the main frame in such a way as to resist vertical pressure, the cross-bars of the main frame tying it together to resist spreading, and the attachment of the intermediate frame to the main frame through the medium of the chairs, as before described, being sufficient to overcome torsional strains due to centrifugal action and the stress of the inertia of the mass carried thereon.

Each of the cross-struts comprises an intermediate compression web or plate provided with apertures allowing of the passage of the products of combustion therethrough and cradles for the support of the upper drum of the boiler. The struts are constructed individually, as follows:

The rear strut B B, Figs. 5, 6, 7, and 19, is built up of a central compression-web 23, having a range of apertures 24, providing admission to the grate and ash-pan, and upper stoking-apertures 25, located above the grate-bar level, the sides of the upper portion of the compression-plate above the top of the side girders converging upwardly. Between the lower angle-irons 19 extend angle-irons 26, their vertical (27) and horizontal (28) webs being secured rigidly to the compression-plate 23 and to the horizontal crown 13 of the rear chair 11, there being two such angle-irons, one at each side of the compression-plate, as clearly indicated in Fig. 5. To the sides of the compression-plate are riveted other angle-irons 29, one at each side, which conform to the contour of the sides of the compression-plate and are riveted to the longitudinal flanges 30 of the girders. To the top of the compression-web on each side is riveted an angle-iron 31 to form the base for the support of a cradle which supports two drums of the boilers. This cradle is formed in two parts, comprising a flat plate 32, curved at the ends 33, and a chair or casting 34, having curved sides 35, flat top 36, flat base 37, and central web 38. The base 37 is provided with longitudinal apertures 39 and the plate 32 with holes through which pass bolts 40. The bolts also pass through a block 41, Fig. 5, lying on top of the base 37 of the chair, said block passing through an aperture 42 formed in the vertical web 38 thereof.

The strut B B is provided with angle-iron braces 43 44 for staying it longitudinally, each rear brace 43 being bent at 43$^a$ and secured to the rear end of the side girder, as shown in Figs. 5 and 6, and each front brace 44 extending directly down to the girder. All of the braces are formed of angle-iron and are secured to the cradle-plate 32 and to the angle-irons 18 19 through the medium of angle plates or bars 18$^a$, secured to the tops of the angle-irons 18.

In Fig. 6 is illustrated the manner of providing a further frame for the support of the lagging or exterior finish of the boiler, which will be hereinafter described.

To the forward face of the compression-web 25 is secured a channel-bar 45, having a T-shaped top 46, and a lower forwardly-extending flange 47, to which is secured a flanged iron 48, forming part of the top of the rear section of the ash-pan 49.

As to the strut D D, by reference to Figs. 8, 9, 10, and 19 it will be noted that it comprises, primarily, a central or compression plate 50, made up of a transverse plate 51 and depending sides or legs 52, extending outwardly and downwardly from the upper portion of the plate, through which an enlarged aperture 53 is formed for the passage of the products of combustion, the aperture being defined by the base-piece 51, side uprights 52$^a$, and top cross-bar 54, Fig. 10, the plate having at the upper corners the outwardly-extending ears 55, which form part of the support for the sheathing-frame. The strut primarily finds its support on the lower angle-irons 19 of the side girders, on the horizontal webs of which the legs 52 of the compression-plate rests, these legs being reinforced by plates 56, having bent ends 57 resting on and riveted directly to said web. To the lower cross-piece of the compression-plate are secured the angle-irons 60 61, the angle-iron 61 being elevated slightly above the base of angle-iron 60, and directly above these angle-irons are secured, one on each side of the compression-plate, other angle-irons, 58 59, the top horizontal webs of which are located flush with the bottom of the opening 53 through the plate, their outer ends 62 (as on plate 50) being cut away to enable the horizontal webs of the upper girder angle-irons 18 to rest thereon and on the top of the compression-plate legs 52. To the faces of the side uprights 52ª are secured angle-irons 63, their lower ends resting directly upon the horizontal web of the angle-irons 58 59 and their upper ends lying beneath the horizontal web of other angle-irons, 64, which are riveted to the sides of the compression-plate cross-piece 54 and form, with the said top cross-piece, as shown in Fig. 9, a base for the support of the drum-cradles. The cradles comprise end chairs 65, having their longitudinal flanges 66 riveted or bolted to the horizontal webs of the angle-irons 64, a curved web 67, and a connecting-web 68, and a central chair 69, constructed similarly to the chair 34 on strut B B as to provision for movement between it and the strut, except that no guide and restraining-plate is employed. The chair consists of a base 70, vertical and top horizontal webs 71 72, and the side curved webs 73, oppositely disposed, the webs 67 73 of the central and end chairs having curves forming segments of the same arc, so as to firmly receive and cradle the two top drums of the boiler. The strut D D by the foregoing construction assists in tying the side girders together and at the same time provides a strong and stable support for the top drums at this point.

To the horizontal webs of the angle-irons 58 60 at the base of the plate 50 are secured flanges formed on a transversely-disposed channel-casting 74, having a shelf 75 and a rearwardly and downwardly extending arm 76, provided with a flange 77 for the support of the front end plate 78 of the ash-pan. Secured upon the horizontal flange of the upper rear angle-iron is an upwardly and rearwardly extending inclined plate 79, providing a base upon which is laid fire-brick for the purpose of forming the fire-box deflector or arch, which extends, as indicated in Figs. 10, 19, and 20, from the bottom of the opening 53 through the compression-plate, other parts being provided with fire-brick, as hereinafter described.

The two forward angle-irons 59 61 are provided with a sheath or covering 80 and together with the sheath form a housing for the reception of the upper end of one of the spring-supported toggle-links, hereinafter to be described, and below the lower angle-irons 60 61 the compression-plate is extended downwardly at 81 and enlarged by the addition of cross-plates 82 83 to form a cross-head lying between guides extending from the lower intermediate header. The lower angle-iron 60 also forms a means for supporting further sheathing, hereinafter described.

The strut F F is illustrated in Figs. 3, 4, 11, 12, 13, 14, 21, and 24. Referring to Figs. 12, 13, and 14, it will be noted that the base of the strut comprises a base-plate 84, upon which the lower angle-irons 19 and the plate 10 of the side girders rest, as clearly shown in said figures. Between the tops of the upper chords 2 of the main frame and the bottom of the base-plate are plate-posts 85, having their ends 86 extending transversely and at an angle. An angle plate or casting 87, having flanged ends 88, is inserted between the chords 2 3 and bolted thereto, forming, with the plates 85, the chair 12. Secured to said upper chords and to the base-plate and within the flanges or lapped end 89 of the base-plate 84 extends an inverted arch-brace 90, such brace having horizontal ends 91, bolted to the angle-irons 19, a horizontal cross-bar 92, provided with lapped recesses 93 to receive the main-frame top chords and upwardly-diverging portions 94, the ends 91 94 forming an extended shelf or bracket for the support of the strut at this point. This construction provides a firm and stable support for the strut to resist vertical and transverse strains. The main compression-plate 95 of this strut rests upon the base-plate 84 substantially midway between its front and rear edges (see Fig. 14) and is firmly secured to said base-plate by means of the transversely-disposed angle-irons 96 97, (96 having its upright flange cut away,) which are firmly riveted to the bottom of the compression-plate and to the base-plate, the ends of the angle-irons 96 being cut away to receive the lower irons 19 and the ends of the angle-irons 97 having an upward set, as at 98, Fig. 13, to lap over the lower angle-irons 19 of the side girders, to which such ends are riveted. At the top of the compression-plate (which is centrally apertured at 99 to allow the products of combustion to pass therethrough) is set the cradle base-plate 100, it being projected rearwardly from the top of the compression-plate instead of being mounted centrally thereon. The rear edge of the cradle base-plate is supported by the angle-irons 101, which follow the inclined edges of the plate 95 and diverge downwardly toward the girders, where their bent ends 102 are riveted to the side girders, as indicated in Fig. 12. Other angle-irons, 103, secured directly to the rear face of the compression-plate 95 and having the same plane of location as the angle-irons 101, form with said latter angle-irons a stable support for the base-plate 100 of the cradle, the angle-irons 103 being riveted to the compression-plate and to the angle-irons 19 and vertical plates of the side girders, as shown in Fig. 14. The base-plate 100 is flat centrally; but its ends 104 are curved upwardly. Below the base-plate lie angle-irons 105, the horizontal webs of which are also curved upwardly and secured to the base-plate 100. At the rear edge of the base-plate and upon the horizontal and vertical angle-irons 101 105 at that point is firmly riveted a cross stay-plate 106. In this way the upper part of the strut F F is firmly braced and the cradle for the forward ends of the upper drums firmly supported. This cradle comprises the base-plate 100 with its curved ends and the intervening casting or chair 107, having the horizontal upper and lower webs 108 109, vertical connecting-web 110, and side or end webs 111 disposed each in the arc of a circle, being a segment of that on which the ends of the base-plate are struck. The lower horizontal web 109 of the chair is bolted to the base-plate, the bolts passing through transversely-extending holes or slots in the lower web. To stay the strut F F where it projects over the side girders, the inclined plates 112 are employed, having their lower ends 113 bent and riveted to the top angle-irons 18 of the side girders, the longitudinal webs of the compression-plate angle-irons 101 103 being riveted to these plates. Short angle-irons, having an inclined web 114, secured to the face of the plates 112, and a curved web 115, are secured to the curved ends of the cradle base-plate. Other short angle-irons, 116, are secured, respectively, to the rear face of the base portion of the compression-web. The angle-irons 116 do not extend all the way across the base of the compression-plate, but between them are located seats 117 for the reception of the springs and links for supporting the front ends of the lower header. The seats have vertical webs 118 secured directly to the compression-plate 95, Fig. 14, and a thick horizontal outwardly-extending web 119, having an aperture for the passage of the suspension bolts or links, the web 119 resting on the strut base-plate to firmly support the spring-seats thereon. Directly below the seats and secured to the sides of the upright plates 85 are guide-castings 120, comprising a top web 121, riveted to the strut base-plate 84, webs 122, bolted to the upright plates 85, and side or laterally-extending webs or flanges 123, forming a guideway for the reception of a cross-head secured to the front end of the lower header. On this strut is also built up a framework for supporting the lagging or other exterior finish of the locomotive.

Although the intermediate or boiler-supporting frame in the particular embodiment of the invention illustrated is constructed as described above, it is apparent that it can be otherwise constructed and modified to suit varying conditions of service and to accommodate it to the support of a boiler or generator different from that for which this particular construction was designed. Nevertheless the present construction of intermediate frame embodies many features of utility and importance. Some of such features are evident of themselves; but in order that others may be appreciated it is desirable to explain briefly the particular form of boiler for the support of which the frame was designed. Such a boiler is illustrated in Fig. 15, and as there shown it comprises two upper drums 124, which are supported upon the struts so as to allow for expansion and contraction; a dry-pipe 126, which is connected with the drums by suitable short pipes 125; side headers 134, which are connected with the drums by gangs of water-tubes 135 142, and a lower intermediate header 141, which is connected with the forward portions of both drums by gangs of water-tubes 139, the header 141 being supported flexibly from the struts and located slightly above the main frame below the plane of the tops of the driving-wheels and as close as possible to the center of gravity. The upper drums are rigidly secured to the front strut F F; but the connection of the drums to the rear strut B B and intermediate strut D D is a flexible or adjustable one, so as to allow of longitudinal expansion or contraction of the drums on the intermediate frame or a throw of the same when rounding curves without subjecting the drums to strain and also to allow of longitudinal expansion and contraction of the parts of the intermediate frame at the fire-box and independently of the drums and without involving them. The lower halves or sections of the drums are riveted to the curved sections of the drum-chairs, as indicated in Fig. 5, longitudinal slots in the base of the chair on the rear strut B B and apertures in the vertical web thereof permitting longitudinal movement between the chair and the cradle base-plate of the strut independently of each other, the plate and the bolts tying the parts together against vertical movement relatively to each other. The side headers 134 are supported at three points along their length.

To provide against straining the tubes 135 139 142 longitudinally and loosening their connection with the drums and headers (the expansion and contraction of the tubes being taken up by their bends) and to allow the headers, drums, and tubes to move conjointly or simultaneously forward or rearward on contraction or expansion and also to firmly hang or support the side headers and relieve the tubes of all strains therefrom, each of the side headers is supported at the rear end by means of a knuckle-joint, at the forward end by a chair, and at an intermediate point by a knuckle-joint connection. The rear support, Figs. 2, 15, 17, 19, and 20, it will be noted, is located at the extreme rear end of the header and at the end of the fire-box closely adjacent the strut B B and comprises a head or knuckle 185, firmly riveted or secured to the tube-sheet 143 of the header below and free from the tubes. Between the arms 186 of the knuckle extends a headed bolt 187, and firmly secured to the inwardly-extending horizontal flange of the upper-girder angle-iron 18 of the frame is a bar 188, having an upturned and apertured head 189, through which the bolt 187 passes, the bolt being adapted to move longitudinally through said head. The intermediate support is secured to the side uprights of the intermediate strut D D and comprises outwardly-extending bars 190, Fig. 9, having bent ends secured to the angle-iron 63, their outer ends being apertured to receive a bolt 191, Fig. 17, the outer ends of which are secured to the arms 192 of a knuckle 193, Fig. 17, riveted to the tube-sheet of the header. Referring to Figs. 12 and 17, it will be noted that the front support 194 comprises a plate forming a chair, having an upper curved arm 195, riveted to and conforming to the curve of the header tube-sheet, a vertical arm 196, and an outwardly-bent lower arm 197, riveted to the inwardly-projected horizontal flange of the upper-girder angle-iron 18 of the frame. In this way provision is made for permitting both the side headers, the drums, and the tubes extending between them to move in unison with each other longitudinally to a limited extent and independently of the intermediate frame. Provision is further made for flexibly supporting the lower or bottom header 141 upon the intermediate frame, so as to allow for expansion or contraction of the tubes connecting this header with the drums without subjecting them to strain, at the same time firmly supporting the header, and, further, to allow of the longitudinal movement of either the header or its bank of tubes conjointly with or independently, within limited extent, however, of the drums and upper ends of the tubes. To accomplish this result and further prevent any transverse movement of the header bodily or a longitudinal movement of the front part of the header, a three-part support is provided. At the forward end of the header 141 is provided a cross-head 198, (see Fig. 16,) which is adapted to engage the forward strut to allow vertical movement of the drum, while restricting it from bodily longitudinal movement. This end of the header is supported by spring-links adapted to permit of a vertical movement only for vertical expansion or contraction of the tubes, while at the rear end of the header is provided an articulated-link support and an intermediate guide, allowing of a vertical movement or slight swing of the header relative to the intermediate frame, while restraining transverse movement. This arrangement is as follows: The forward cross-head 198 comprises a casting having a curved-under flange 199, made to conform to the curve of the tube-sheet 140 of the header, vertical side arms 200, and a horizontal top bar 201, the curved flange 199 resting upon the header and riveted to it and the flange 179 of the inside ribbing-frame, as shown in Fig. 12. The top bar 201 of the cross-head is apertured at 202, and these apertures, located adjacent to side arms 200 of the cross-head, lead into recesses 203. From the side arms 200 extend outwardly squared guide-heads 204. To the compression-plate 95 of the forward strut F F and in line with the openings 202 in the cross-head 198 when the parts are assembled are affixed spring-seats 117. These seats are adapted to carry coil-springs 205 (see Figs. 12 and 21) or other forms of resilient connections, and upon these spring-bolts 206 bear. These bolts pass through the springs and through the holes formed in the spring-seats, the base-plate of the strut, and the holes in the cross-head, the heads 207 of the bolts lying in the recesses of the cross-head and directly supporting it and the header at this end, and between the adjusting-nuts 208 of the bolts lying within the spring-seat are spring caps or plates 209. Secured to the upright arms or king-posts 85 of the strut F F (see Fig. 14) are guide-castings 117, having side plates and intermediate grooves 210, Fig. 14, with which grooves the guide-heads 204 of the cross-head are adapted to engage. By this construction the header at this end is permitted to have a movement up and down against the stress of the suspending-springs to allow for expansion and contraction of the tubes, while longitudinal or transverse movement of the header is restrained. At the rear end of the header is provided an arched plate 211, Fig. 16, riveted to the tube-sheet 140 of the header and conforming to its curve, from which plate extend upwardly two lugs 212, located adjacent to the longitudinal center of the header, and at the sides of said plate and extending upwardly are two lugs or bars 213, having transverse apertures 214.

The compression-plate 51 of the strut D D has a pendent projection 81, Figs. 9, 10, and 23, and the bottom of this projection is provided with bars 82 83, both rigidly bolted to the projection, which bars increase the transverse thickness of the projection at this point to form a guide or restraining head 215. The compression-plate 50 of this strut is also provided with an outwardly-extending angle-iron 61, which, together with the angle-iron 59, located directly above it, and the sheathing 80, (upon which fire-brick is located,) form a housing 216 for the coil suspension-springs 217. (Shown in Fig. 10.) The horizontal web of the lower angle-iron is provided at each end with an aperture, and through these apertures extend the upper sections 218 of the toggle links or hangers, the lower link comprising the paired plates 219, pivotally secured by bolts 220 to the apertured eye 221 of the upper link 218 and to the eye of the lug 213, extending from the plate 211, by the bolts 222, the plate being rigidly affixed to the tube-sheet of the header. Each upper link 218 where it extends through the angle-iron 61 into the housing 216 is surrounded by a coil or other form of spring 217 and has adjusting-nuts 223 and a spring-cap 224 bearing upon the top of the springs. These spring-links are so located that when the parts are assembled the pendent projection 81 from the compression web or plate of the strut D D will extend into the space between the lugs 212 on the plate 211, Figs. 16 and 23, the enlarged head 215 of said projection engaging at the side with the sides of the lugs, so as to form a restraining-guide for the header. By this arrangement the forward end of the header, the rear end of the header, and the tubes connected therewith may have a longitudinal movement conjointly with the drums, the side headers, and their connecting-tubes and independently of the intermediate frame to allow of expansion or contraction, which movement is only limited by the amount of compression allowed the springs 217 and the movement at the articulation of the links, while the springs themselves, conjointly with the springs 205, resiliently support the header and the weight of the tubes connected therewith, so as to relieve said tubes and header of any strain tending to produce bad joints or rupture.

Through the foregoing arrangement means are provided for supporting the boiler in a stable and efficient manner, while preserving ample accommodations for expansion or contraction of the parts thereof and permitting a deflection between the boiler and the intermediate frame on rounding curves without impairing its support, and all of the beneficial attributes of a water-tube boiler or water-circulating generator are obtained, in addition to the beneficial results flowing from the novel construction of the boiler illustrated and described herein in its coöperative relationship with the various fundamental parts of a locomotive structure, and the means for carrying the boiler permit the utilization of all the desirable qualities and characteristics of a boiler of this kind in a locomotive, the boiler being firmly and stably supported upon the main frame of the locomotive, which latter, in addition to supporting the weight and stress of the superposed frame and boiler and other appurtenances, has only to perform the functions of a frame in carrying and maintaining the parallelism of the axles and their adjuncts.

Another feature of improvement, although not essential, yet highly desirable, is the framework or superstructure adapted to carry the lagging and a part of the exterior finish of the locomotive, including the cab-section and the smoke-box section. The sheathing as to its main body takes the form shown generally in section in Fig. 7 and comprises side pieces 225, extending along between the cab-section and the smoke-box section, Figs. 8, 22, and 23, and secured at their lower sides to the side plates and the side girders 10. The lower sheathing-plates have inwardly-bent upper edges 226, to which are secured angle-irons 227, and from these angle-irons rise vertical side plates 228, having angle-irons 229 secured to their upper edges. Between the angle-irons 229 extends the crown-piece 230 for supporting the top lagging 300, the edges of the crown-sheet being connected to the angle-irons 229 by angle lapped plates 231.

The above-described sheathing extends in this particular form only over the fire-box section, that over the intermediate section (as shown in Fig. 12) involving substantially the same lower sheathing-plates 225. Their upper inwardly-bent edges 226, however, are bolted to the outer edges of horizontal plates and supporting angle-irons $226^b$, the inner edges of said horizontal plates being secured to angle-irons $226^c$, which are in turn riveted to the outside faces of vertical plates $226^d$. The latter have angle-irons $227^a$ secured to their upper edges, forming flat tops, on which are bolted the longitudinal angle-iron $228^a$, to which latter the lower edges of the crown-sheet $230^a$ are riveted, the crown-sheet having vertical portions at its lower edges.

At the forward end of the locomotive (see Figs. 1, 21, and 24) is the smoke-box cylinder 290, with its head secured to the ends of the sheathing. Beneath the boiler and between the smoke-box and fire-box the sheathing consists of an angle and sheet iron quadrangular structure secured to and supported by the main and intermediate frames. The upright sheathing-plate 236, Figs. 14 and 24, at the front end is secured to the angle-iron 235 and another angle-iron, 237, attached to the cross-bar 92 and extending between the plate-posts 85. The lower sheathing-plate comprises a portion 238 between the posts 85, secured to angle or Z bars 239, depending, as shown in Fig. 12, from the flanges 86 of the posts 85 and having thick edges to which the plate 238 is bolted or otherwise secured. The plate 238 extends forward to the line where it meets the pendent sheathing 236 in front of the fore part of the lower header, and its rear edge 240 projects just beyond the edges of the posts 85, where the remaining piece 241 of the lower sheathing-plate is conveniently secured. This bottom portion 241, Figs. 8 and 23, extends rearwardly from the edge 240, above described, between the upper chords 2 of the side members of the main frame and is removably secured at its side edges, as by bolts, to angle-plates 242 similar to those, 239, sustaining the plate 238. Its rear edge is secured to the lower forwardly-extending flange 243, formed on the end piece 244 of the quadrangular sheathing structure, the upper flange 245 being bolted to the angle-iron 60 of the middle strut D D. An aperture covered by a plate 246 is provided in said end piece for access to the interior, the blow-off pipe 184 being adapted to project through this end piece. The bottom supporting angle-irons 242ʼ are secured to other angle-bars, 247, Fig. 8, which are in turn riveted to the lower edges of plates 248. The latter form the vertical sides of this sheathing structure and depend from the angle-bar supports 249, being secured in any desired manner at their rear ends to the middle strut D D and at their forward ends to the front strut F F, adjacent to the outer vertical webs 118 of the springseats 117 and on a level with the angle-irons 116. Horizontal sheathing-plates 250ᵃ extend from these supporting-irons 249 to similar irons or plates 251ᵃ, secured along the plates 10 of the side girders. This sheathing supports the outside lagging and for a portion of its longitudinal extension the interior fire-brick, and at the rear end it is firmly secured to the front of the cab. The three sides of the cab and its roof are built up as desired and have the usual appurtenances, the cab being supported on the top cross-piece of the cradle 11 and on the truss-frame 270, Fig. 2, mounted upon the rear end of the main or truck frame and projecting over the sides thereof. The top horizontal bar 271 of the truss rests upon the upper chords 2, while the truss-braces 272 pass beneath the same and incline upward at the ends outside of the said chord to meet the ends of the horizontal bar. A bracing or filling 273 is secured between the upper and lower bars 271 272 between the chords 2 of the main frame. Other means for supporting the cab may be obviously employed.

A sheathing-frame is built up and secured to the intermediate frame for supporting the sheathing, lagging, and the upper fire-brick work. This frame is constructed as follows: At the strut B B plates 351, Fig. 7, extend outwardly and upwardly and may be secured to or form continuations of the compression-plate 23 of the strut, their inclined bases having angle-irons 352 riveted thereto and to the horizontal webs of the strut angle-irons 29. The outer edges of the extension-plates are provided with steps, to the vertical edges of which are secured upright angle-irons 353 on each side, (see Figs. 6 and 7,) the lower points of the extension-plate and the angle-irons secured thereto resting upon angle-irons 18ᵃ, which extend between the front and rear strut-braces 43 and 44, each of such angle-irons having its web riveted to the top-girder angle-iron 18 and to the said braces. The step formed between the top and the bottom of the side of the extension-plate forms the means for supporting the longitudinally-extending angle-iron 227, and to the upper point of each extension-plate is secured an angle-iron 229, carrying the angle-welt or lap-plate 231. Between the inner flanges of the two plates 231 extend the transverse upwardly-curved ribs or T-irons 354. The frame thus outlined, it will be noted, defines the disposition of the sheathing-plates.

At the strut D D the sheathing-frame corresponding to that just described is secured to the corners or ears 55 of the compression-plate through the instrumentality of short upright angle-iron bars 355, Fig. 8, which are riveted to the ears 55. To the outer webs of the bars 355 the longitudinal angle-irons 227 are secured, and to the latter the lower side plates 225 of the sheathing are riveted. The upper ends have their flanges inset to accommodate the angle-irons 229, on which are bolted the lap-plates 231. In addition there are short compression-plates 256, having inclined tops shaped to conform to the curve of the crown-piece 230 of the sheathing, which short compression-plates are secured to the top angle-bars 64 of the strut by means of the short angle-bars 357. The upper edges of the short compression-plates have rearwardly-extending flanges 358, to which the crown-piece of the sheathing is secured, the short compression-plates being riveted to the depending web of the cross-ribs 354. The form of the sheathing over the intermediate section is different from that over the fire-box section.

At the strut F F wings 360 (see Fig. 12) are secured by angle-irons to the inclined plates 112 and have vertical irons 361 at their outer edges, to which the vertical sheathing-plate 226ᵈ is fixed. A longitudinal angle-iron 226 is riveted to this vertical plate at this strut, and the horizontal plate 226ᵃ is carried thereby, a similar angle-iron 226ᵇ being secured to the outer edge of the plate. Short supporting-irons 362 extend from the iron 226ᵇ to the iron 226, on which the plate 226ᵃ rests. An angle-iron 363 is secured to the plate 226ᵈ and to an angle-plate 364, riveted to the inclined plate 112. Angle-iron strut-bars 362ᵃ extend from the top of the girder 10 to the bar 226ᵇ. On the top edge of the plate 226ᵈ and supported also by the wings 360 and irons 361 are two angle-irons 227ᵃ, as explained before, carrying a plate 228ᵃ, to which are riveted the edges of the crown-sheet and ends of the crown-supporting ribs 354ᵃ. These parts may be secured to the strut D D in any preferred way, as by riveting the ends of the angle-irons 226 thereto or affixing the ends of the plates 226ᵈ thereto in any desired manner.

I claim as my invention—

1. In a locomotive, the combination of a main frame, an intermediate frame secured upon the main frame, and a generator flexibly supported upon the intermediate frame.

2. In a locomotive, the combination of a main frame, an intermediate frame, and a generator comprising upper drums, side headers, and a lower intermediate header connected by tubes, the drums and headers being flexibly supported upon the intermediate frame.

3. In a locomotive, the combination of a locomotive-frame, a generator comprising drums and headers connected by tubes, and means for flexibly supporting said generator upon said frame.

4. In a locomotive, the combination of a locomotive-frame, a generator comprising drums and headers connected by tubes, and means for movably supporting the drums and headers upon the frame and restraining such movement.

5. In a locomotive, the combination of a locomotive-frame, a generator comprising drums and headers connected by tubes, means for resiliently supporting the headers upon the frame, and means for movably supporting the drums on the frame.

6. In a locomotive, the combination of a frame, a generator, means interposed between the generator and frame permitting horizontal and perpendicular movement of the generator upon the frame, and means for restraining said movement.

7. In a locomotive, the combination of a frame, a generator comprising in its construction a longitudinally-disposed header, and means for flexibly supporting the header upon said frame.

8. In a locomotive, the combination of a frame, a generator having a longitudinally-disposed header, and means for resiliently supporting the header upon the frame.

9. In a locomotive, the combination of main and intermediate frames, a generator supported by said intermediate frame, and a lagging frame supported on said intermediate frame.

10. In a locomotive, the combination of a main frame, comprising longitudinal chords, an intermediate frame, a generator supported upon the intermediate frame, and chairs supporting the intermediate frame and secured to the chords of the main frame.

11. In a locomotive, the combination of an intermediate frame having side beams and cross-struts, a generator having longitudinally-disposed drums, and chairs secured to said drums and movably supported upon said struts.

12. In a locomotive, the combination of a main frame, a truss-frame secured to the rear end of the main frame, an intermediate frame, and a cab-section built upon and supported by said truss and by the intermediate frame.

13. In a locomotive, the combination of a main frame having upper and lower chords, an intermediate frame having cross-struts secured to the upper chord, a truss-frame carried by said main frame at the rear end, and a cab-section in the rear of the back cross-strut and supported thereby and by the intermediate frame and truss.

14. In a locomotive, the combination of a main frame, an intermediate frame supported thereon having side girders and cross-struts, the main frame projecting rearwardly beyond the intermediate frame, a cross-bar at the rear end of the main frame, and a cab located between the girders and in the rear of the back strut and supported by said girders, strut and cross-bar.

15. In a locomotive, an intermediate frame having side beams and cross-struts, and a generator having longitudinally-disposed drums flexibly supported upon said struts.

16. In a locomotive, an intermediate frame having side beams and cross-struts and a generator having longitudinally-disposed drums, said drums being rigidly secured to one of the struts at one end, and flexibly supported on another at the other end.

17. In a locomotive, the combination of a main frame, an intermediate frame supported on the main frame, cross-struts on said intermediate frame dividing the locomotive into a cab-section, a fire-box section, an intermediate section, and a smoke-box section, a boiler supported on the struts and intermediate frame, and a covering for the whole.

18. In a locomotive, the combination of a main frame, an intermediate frame supported thereon, cross-struts on said intermediate frame dividing the locomotive into a cab-section, a fire-box section, an intermediate section, and a smoke-box section, the said struts comprising transverse plates properly apertured for communication between the sections, a boiler supported on the struts and intermediate frame, and a covering for the whole.

19. In a locomotive, the combination of a main frame, an intermediate frame carried thereby, and three struts comprising transverse plates extending across the frame to support the several sections of the locomotive and to support the generator and apertured to allow communication between the sections.

20. In a locomotive, the combination of a main frame having upper and lower chords, an intermediate frame secured to the upper chord and comprising longitudinal girders, chairs between the said girders and the top chord of the main frame, transverse cross-struts between the girders, and a boiler supported upon the struts and intermediate frame.

21. In a locomotive, a main frame, an intermediate frame comprising longitudinal girders, chairs upon the main frame supporting the girders, and transverse struts at the ends and midway between to tie the girders together.

22. In a locomotive, the combination of a main frame having upper and lower chords, an intermediate frame comprising longitudinal girders, chairs attached to the said upper chords to support the girders, and struts at the ends and midway between to tie the girders together.

23. In a locomotive, the combination of a main frame, an intermediate frame wider than the main frame and supported thereon, and a boiler supported on the intermediate frame.

24. In a locomotive, the combination of a main frame, an intermediate frame comprising longitudinal girders, chairs upon the main frame supporting the girders, and transverse struts at the ends and midway between to tie the girders together, and a generator supported by said frames.

25. In a steam-generator, the combination of a frame, a header, tubes connected with one side thereof, a cross-head on one end of the header, guides for the cross-head on the frame, a spring-support for said end of the header, and means to support the other end of the header.

26. In a steam-generator, the combination of a header, tubes connected with one side thereof, a cross-head attached to one end of the header, a frame having guides for the cross-head, pins connected with the said head and extending up through the frame and springs to support said pins.

27. In a steam-generator, the combination of a header, tubes connected therewith, a frame for supporting the same, guides at one end on the header, guides on the frame coöperating with the other guides to allow longitudinal movement of the header, swinging links for supporting the said end and means for supporting the other end of the header.

28. In a steam-generator, the combination of a header, tubes connected therewith, a frame for supporting the same, guides on the end of the header, and other guides on the frame to provide for longitudinal movement of said end of the header, and spring-supported swing-links to suspend the same from the frame.

29. In a steam-generator, the combination of a frame comprising cross-struts, a header flexibly suspended from said cross-struts, a guide comprising lugs depending from one of said struts, and upwardly-projecting lugs on the top of said header coöperating with the depending lugs, whereby longitudinal movement between the said guides may take place.

30. In a steam-generator, the combination of a frame, cross-struts, a header flexibly suspended beneath them, castings secured to one of the struts and having vertical guiding slots or flanges, and lugs on the sides of the header adapted to move in said slots, whereby the header can move vertically.

31. In a locomotive, a frame, a steam-generator, and a sheathing over the same comprising an angle-iron framework, bracing and struts riveted to the frame of the locomotive, and plates of sheet-iron riveted to said framework.

32. In a locomotive, a frame comprising side girders and cross-struts to tie the girders together, a generator supported thereby, a sheathing over the whole comprising an angle-iron framework riveted to said girders and struts and extending over the top and sides of the generator above the girders, and sheathing-plates laid upon and secured to said framework.

33. In a locomotive, the combination of a frame having cross-struts, a generator supported by the frame and struts, a sheathing-frame erected at the said struts and secured thereto and extending over the generator, and a sheathing secured to the said sheathing-frame.

34. In a locomotive, the combination of a main frame, an intermediate frame supported thereby and having side girders and cross-struts, a steam-generator carried by the intermediate frame, a sheathing-frame erected on said struts, and sheathing-plates secured to said frame.

35. In a locomotive, the combination of a frame having side girders and cross-struts, a steam-generator supported by said frame, a sheathing-frame comprising wing-plates secured to the outer edges of said struts, substantially vertical posts riveted to the edges of said wing-plates, a crown rib or strip extending between the upper ends of said posts and over the generator, and sheathing-plates secured to said crown-ribs and vertical posts, to entirely envelop the top and sides of the generator.

36. In a locomotive, the combination of a frame comprising end struts and an intermediate strut, a generator supported thereby comprising drums resting on the tops of the struts and side headers supported outside the struts, a sheathing-framework built up from said struts outside the side headers and thence over the crown above the drums, and a sheathing secured to said frame so as to envelop the said generator and removable over the drums outside the headers.

37. In a locomotive, the combination of a frame having side girders, and a cross-strut to tie the girders together, a steam-generator supported by said frame and strut, a sheathing-framework secured to said strut comprising wing-plates riveted to the outer inclined edges of the strut, the outer edges of said plates being stepped, longitudinal angle-irons having their ends resting in such steps, strut angle-irons riveted to the substantially vertical edges of said steps, other longitudinal angle-plates secured to the upper ends of the upper struts, the lower ends of the bottom struts resting on the upper edges of the said girders, a crown rib or brace sprung from the top of one of the wings or upper struts over the generator to the other wing or strut, and sheathing-plates secured to the framework, the lower plate on each side being removably secured between the top edges of the girders and the longitudinal angle-irons resting in the steps.

38. In a locomotive, the combination of a frame comprising side girders and cross-struts, a generator supported thereby, sheathing beneath the generator comprising a box-like structure of sheet metal secured at its ends to the cross-struts, and horizontal plates extending from the upper side edges of said structure to the said girders, to completely inclose the lower part of the generator.

39. In a locomotive, the combination of a main frame having upper and lower chords, an intermediate frame having side girders and a front and an intermediate strut, a steam-generator secured to said intermediate frame having a header suspended beneath the said struts, sheathing for the header and lower part of the generator comprising a front or end plate riveted to the bottom of the front strut and a rear plate suspended from the intermediate strut, a bottom plate extending between the front and rear plates, vertical side plates secured to the bottom and to the rear end plate, horizontal plates extending between the tops of the side plates and the side girders of the frame, and angle-irons to secure the said plates together and to the struts and side girders.

40. In a locomotive, the combination of main and intermediate frames, a generator supported by said intermediate frame, and a lagging frame supported on said intermediate frame.

41. In a locomotive, the combination of a fire-box, an ash-pan having flaring sides extending up over the drive-wheels, openings in said sides for the wheels, and boxes or casings built up from said sides over the wheels.

42. In a locomotive, the combination of a fire-box, a grate located above and wider than the drive-wheels, an ash-pan comprising a narrow box located between said drive-wheels, flaring sides connecting said box with the outer edge of the grates and dropped down over the drivers, and casings built up from said sides over the drive-wheels.

43. In a locomotive, the combination of a main frame, an intermediate frame having girders outside of the wheels, a fire-box section between the girders, and a grate, said grate extending between the said girders.

44. In a locomotive, the combination of a main frame, an intermediate frame supported thereby and having side girders and cross-struts, a fire-box section, channel-bars having projecting flanges and attached to said girders and struts, grates supported therebetween, and an ash-pan depending from said flanges.

45. In a steam-generator, the combination of a frame, a header, tubes connected with one side thereof, a cross-head on one end of the header, guides for the cross-head on the frame, a spring-support for said end of the header, and means to support the other end of the header.

46. In a steam-generator, the combination of a header, tubes connected with one side thereof, a cross-head attached to one end of the header, a frame having guides for the cross-head, pins connected with the said head and extending up through the frame and springs to support said pins.

47. In a steam-generator, the combination of a header, tubes connected therewith, a frame for supporting the same, guides at one end of the header, guides on the frame coöperating with the other guides to allow longitudinal movement of the header, swinging links for supporting the said end and means for supporting the other end of the header.

48. In a steam-generator, the combination of a header, tubes connected therewith, a frame for supporting the same, guides on the end of the header, and other guides on the frame to provide for longitudinal movement of said end of the header, and spring-supported swing-links to suspend the same from the frame.

49. In a steam-generator, the combination of a frame comprising cross-struts, a header flexibly suspended from said cross-struts, a guide comprising lugs depending from one of said struts, and upwardly-projecting lugs on the top of said header coöperating with the depending lugs, whereby longitudinal movement between the said guides may take place.

50. In a steam-generator, the combination of a frame, cross-struts, a header flexibly suspended beneath them, castings secured to one of the struts and having vertical guiding slots or flanges, and lugs on the sides of the header adapted to move in said slots, whereby the header can move vertically.

51. In a steam-generator, the combination of a frame having cross-struts, said struts having openings for the passage of the products of combustion, a lower header, devices to support said header comprising seats on the lower part of the struts between the openings, springs on the seats and bolts supported by the springs and connected with the header, and fire-brick covering protecting said devices.

52. In a steam-generator, the combination of a frame having cross-struts, said struts having openings for the passage of the products of combustion, a lower header, devices on said struts at the lower side of the openings to support the header, and a fire-brick lining for each of said openings and extending over said devices.

53. In a steam-generator, the combination of a frame having cross-struts, said struts having openings for the passage of the products of combustion, a lower header, spring-supports for said header located on the struts beneath the openings, and a fire-brick lining for said openings and covering said spring-supports.

Signed in the city, county, and State of New York this 14th day of December, 1900.

CORNELIUS VANDERBILT.

Witnesses:
JOSEPH L. LEVY,
CHARLES G. HENSLEY.